United States Patent
Hur et al.

(10) Patent No.: US 8,243,231 B2
(45) Date of Patent: Aug. 14, 2012

(54) BACKLIGHT UNIT AND DISPLAY APPARATUS INCLUDING THE SAME

(75) Inventors: Hoon Hur, Pyeongtaek-si (KR); Bup Sung Jung, Pyeongtaek-si (KR); Won Do Kee, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 228 days.

(21) Appl. No.: 12/768,982

(22) Filed: Apr. 28, 2010

(65) Prior Publication Data
US 2011/0051045 A1 Mar. 3, 2011

Related U.S. Application Data

(60) Provisional application No. 61/237,403, filed on Aug. 27, 2009.

(30) Foreign Application Priority Data

Aug. 28, 2009 (KR) .................. 10-2009-0080182

(51) Int. Cl.
*G02F 1/13357* (2006.01)
*F21V 8/00* (2006.01)

(52) U.S. Cl. .......... 349/65; 349/56; 349/58; 349/61; 349/112; 362/97.1; 362/97.2; 362/616

(58) Field of Classification Search ............ 349/56, 349/58, 59, 61, 67, 112, 113, 115, 65; 362/97.1, 362/97.2, 97.3, 97.4, 616
See application file for complete search history.

(56) References Cited

U.S. PATENT DOCUMENTS

| | | | |
|---|---|---|---|
| 5,704,703 A | 1/1998 | Yamada et al. | 362/27 |
| 5,717,422 A | 2/1998 | Fergason | 345/102 |
| 6,011,602 A | 1/2000 | Miyashita et al. | 349/65 |
| 6,241,358 B1 | 6/2001 | Higuchi et al. | 362/31 |
| 6,456,343 B2 | 9/2002 | Kim et al. | 349/58 |
| 6,816,141 B1 | 11/2004 | Fergason | 345/88 |
| 7,125,152 B2 | 10/2006 | Lin et al. | 362/609 |
| 7,311,431 B2 | 12/2007 | Chew et al. | 362/613 |
| 7,312,838 B2 | 12/2007 | Hwang et al. | 349/58 |

(Continued)

FOREIGN PATENT DOCUMENTS

EP 0 987 490 B1 3/2000

(Continued)

OTHER PUBLICATIONS

PCT International Search Report dated Sep. 30, 2010 issued in Application No. PCT/KR2010/001067.

(Continued)

*Primary Examiner* — Brian Healy
(74) *Attorney, Agent, or Firm* — KED Associates LLP

(57) ABSTRACT

A backlight unit may be provided that includes a substrate, light sources, a light guide plate, at least one reflecting member, and an optical sheet. The light sources may be on the substrate. The light guide plate may include a light incident part having a light incident surface to which streaks of light respectively emitted from the light sources are laterally incident, and a light emitting part emitting the incident streaks of light upward. The reflecting member may be disposed on a lower surface of the light guide plate, and may reflect the incident light. The optical sheet may be disposed above the light guide plate. The reflecting member may include a first region having a first reflectance and a second region having a second reflectance.

27 Claims, 18 Drawing Sheets

U.S. PATENT DOCUMENTS

| | | | |
|---|---|---|---|
| 7,413,330 B2 | 8/2008 | Furukawa | 362/600 |
| 7,641,375 B2 | 1/2010 | Fujita et al. | 362/617 |
| 8,113,704 B2 * | 2/2012 | Bae et al. | 362/613 |
| 2001/0017774 A1 | 8/2001 | Ito et al. | 362/31 |
| 2003/0206253 A1 | 11/2003 | Cho | 349/61 |
| 2005/0248939 A1 | 11/2005 | Li et al. | 362/225 |
| 2005/0276075 A1 | 12/2005 | Chen et al. | 362/615 |
| 2006/0044830 A1 * | 3/2006 | Inoue et al. | 362/614 |
| 2006/0114690 A1 | 6/2006 | Iki et al. | 362/612 |
| 2006/0209564 A1 | 9/2006 | Lin et al. | 362/609 |
| 2006/0221638 A1 | 10/2006 | Chew et al. | 362/613 |
| 2006/0239033 A1 | 10/2006 | Jung et al. | 362/612 |
| 2006/0245213 A1 | 11/2006 | Beil et al. | 362/612 |
| 2007/0019419 A1 | 1/2007 | Hafuka et al. | 362/373 |
| 2007/0058390 A1 * | 3/2007 | Sugawara et al. | 362/560 |
| 2007/0076434 A1 * | 4/2007 | Uehara et al. | 362/616 |
| 2007/0247869 A1 | 10/2007 | Lang et al. | 362/612 |
| 2007/0247871 A1 | 10/2007 | Yoo | 362/612 |
| 2008/0205080 A1 | 8/2008 | Erchak et al. | 362/613 |
| 2011/0051045 A1 * | 3/2011 | Hur et al. | 349/65 |

FOREIGN PATENT DOCUMENTS

| | | |
|---|---|---|
| JP | 64-29708 U | 2/1989 |
| JP | 01-261692 A | 10/1989 |
| JP | 08-160425 A | 6/1996 |
| JP | 09-171111 A | 6/1997 |
| JP | 09-186825 A | 7/1997 |
| JP | 09-292531 A | 11/1997 |
| JP | 11-288611 A | 10/1999 |
| JP | 2002-228844 A | 8/2002 |
| JP | 2004-206916 A | 7/2004 |
| JP | 2005-259361 A | 9/2005 |
| JP | 2005-317480 A | 11/2005 |
| JP | 2006-054410 A | 2/2006 |
| JP | 2006-108033 A | 4/2006 |
| JP | 2006-134748 A | 5/2006 |
| JP | 2006-269364 A | 10/2006 |
| JP | 2006-286638 A | 10/2006 |
| JP | 2007-250197 A | 9/2007 |
| JP | 2007-250979 A | 9/2007 |
| JP | 2007-265837 A | 10/2007 |
| JP | 2007-293339 A | 11/2007 |
| JP | 2008-108622 A | 5/2008 |
| JP | 2008-108623 A | 5/2008 |
| JP | 2008-192395 A | 8/2008 |
| JP | 2009-054990 A | 3/2009 |
| KR | 10-2001-0012532 A | 2/2001 |
| KR | 10-2001-0085460 A | 9/2001 |
| KR | 10-2003-016631 A | 3/2003 |
| KR | 10-2005-0067858 A | 7/2005 |
| KR | 10-2005-0067903 A | 7/2005 |
| KR | 10-2005-0112661 A | 12/2005 |
| KR | 10-2006-0106774 A | 10/2006 |
| KR | 10-2007-0001657 A | 1/2007 |
| KR | 10-2007-0002920 A | 1/2007 |
| KR | 10-2007-0029365 A | 3/2007 |
| KR | 10-2007-0104149 A | 10/2007 |
| KR | 10-2008-0070214 A | 7/2008 |
| KR | 10-2008-0078210 A | 8/2008 |
| KR | 10-2009-0022350 A | 3/2009 |
| KR | 10-2009-0040673 A | 4/2009 |
| KR | 10-2009-0109766 A | 10/2009 |
| WO | WO 2009/017067 A1 | 2/2009 |
| WO | WO 2010/038516 A1 | 4/2010 |

OTHER PUBLICATIONS

PCT International Search Report dated Sep. 30, 2010 issued in Application No. PCT/KR2010/001420.

Final Office Action dated Feb. 17, 2011 issued in U.S. Appl. No. 12/618,603.

U.S. Office Action dated May 25, 2011 issued in U.S. Appl. No. 12/453,885.

Korean Notice of Allowance dated Aug. 30, 2011 issued in Application No. 10-2008-0049146 (English translation).

European Search Report dated Aug. 30, 2011 issued in Application No. 09 75 5013.

U.S. Office Action dated Oct. 25, 2011 issued in U.S. Appl. No. 12/727,966.

PCT International Search Report dated Oct. 27, 2010 issued in Application No. PCT/KR2010/001492.

PCT International Search Report dated Oct. 29, 2010 issued in Application No. PCT/KR2010/001485.

Korean Office Action dated Dec. 21, 2010 issued in Application No. 10-2008-0049146.

Korean Office Action dated Dec. 21, 2010 issued in Application No. 10-2008-0099569.

Korean Office Action dated Apr. 9, 2010 issued in Application No. 10-2009-0113708.

Korean Office Action dated Oct. 11, 2010 issued in Application No. 10-2009-0053260.

International Search Report dated Oct. 27, 2010 issued in Application No. PCT/KR2010/001963.

United States Final Office Action dated Nov. 3, 2011 issued in U.S. Appl. No. 12/453,885.

Korean Notice of Allowance dated Nov. 30, 2011 issued in Application No. 10-2008-0049146 (with English translation).

U.S. Office Action dated Feb. 1, 2012 issued in U.S. Appl. No. 12/632,694.

PCT International Search Report dated Oct. 28, 2010 issued in Application No. PCT/KR2010/001422.

PCT International Search Report dated Oct. 28, 2010 issued in Application No. PCT/KR2010/001423.

PCT International Search Report dated Oct. 28, 2010 issued in Application No. PCT/KR2010/001424.

PCT International Search Report dated Oct. 28, 2010 issued in Application No. PCT/KR2010/001425.

U.S. Office Action dated Sep. 7, 2010 issued in U.S. Appl. No. 12/618,603.

PCT International Search Report and Written Opinion dated Jan. 8, 2010 issued in Application No. PCT/KR2009/002782.

Korean Office Action dated Feb. 22, 2010 issued in Application No. 10-2008-0061487.

PCT International Search Report and Written Opinion dated Jun. 23, 2010 issued in Application No. PCT/KR2009/005992.

European Search Report dated Apr. 26, 2011 issued in Application No. 10 01 5492.

United States Office Action dated Jun. 13, 2012 issued in U.S. Appl. No. 12/728,065.

\* cited by examiner

BACKLIGHT UNIT AND DISPLAY APPARATUS INCLUDING THE SAME

CROSS-REFERENCE TO RELATED APPLICATION

The present application claims priority under 35 U.S.C. §119 and 35 U.S.C. §365 to U.S. Provisional Patent Application Ser. No. 61/237,403 filed on Aug. 27, 2009 and Korean Patent Application No. 10-2009-0080182 filed on Aug. 28, 2009, the subject matter of which is hereby incorporated by reference.

BACKGROUND

1. Field

Embodiments of the present invention may relate to a backlight unit and a display apparatus that includes the backlight unit.

2. Background

As information society develops, needs for diverse forms of display apparatuses may increase. Research has been carried out on various display apparatuses such as liquid crystal display devices (LCDs), plasma display panels (PDPs), electro luminescent displays (ELDs), and/or vacuum fluorescent displays (VFDs).

An LCD has a liquid crystal panel that includes a liquid crystal layer, a thin film transistor (TFT) substrate, and a color filter substrate facing the TFT substrate with the liquid crystal layer therebetween. Such a liquid crystal panel, having no light source, may use light provided by a backlight unit to display an image.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
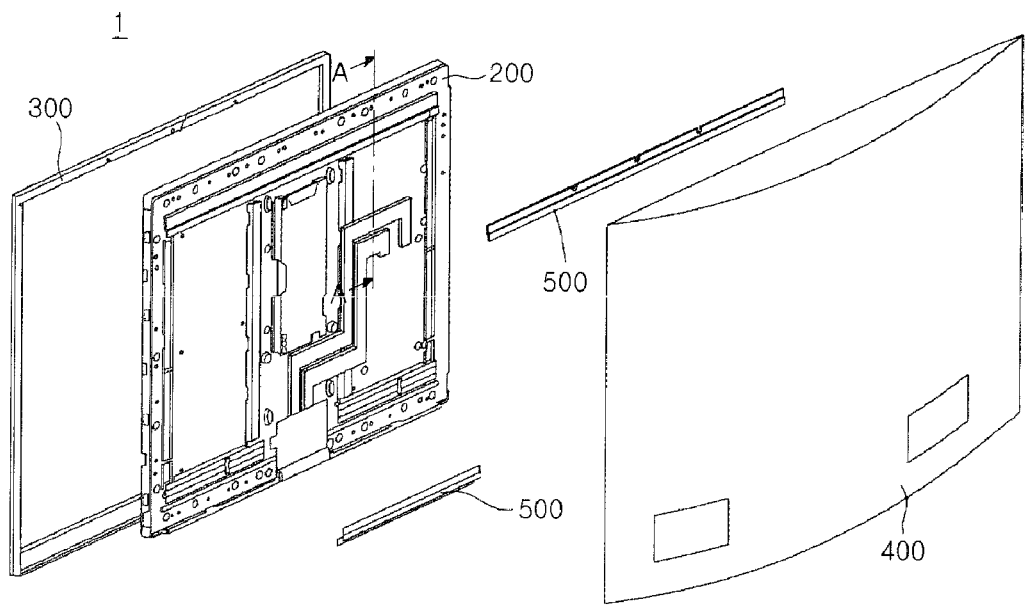
FIG. 1 is an exploded perspective view illustrating a display apparatus.

Reference may now be made in detail with reference to arrangements and embodiments, examples of which are illustrated in the accompanying drawings. The present disclosure may, however, be embodied in many different forms and should not be construed as being limited to arrangements and embodiments set forth herein; rather, these arrangements and embodiments may be provided so that this disclosure will be thorough and complete, and will fully convey the concept of the disclosure to those skilled in the art. In the drawings, shapes and sizes of elements may be exaggerated for clarity.

FIG. 1 is an exploded perspective view illustrating a display apparatus.

As shown in FIG. 1, a display apparatus 1 may include a display module 200, a front cover 300 and a back cover 400 that surround the display module 200, and a fixing member (or attaching member) 500 for fixing or attaching the display module 200 to at least one of the front cover 300 or the back cover 400.

A portion of the fixing member 500 may be fixed or attached to the front cover 300 through a coupling member such as a screw, and then another portion of the fixing member 500 may support the display module 200 with respect to the front cover 300 so that the display module 200 can be fixed or attached with respect to the front cover 300.

Although the fixing member 500 is shown as having an elongated plate shape, the display module 200 may be fixed or attached to the front cover 300 or the back cover 400 through a coupling member without the fixing member 500.

Figure 2:
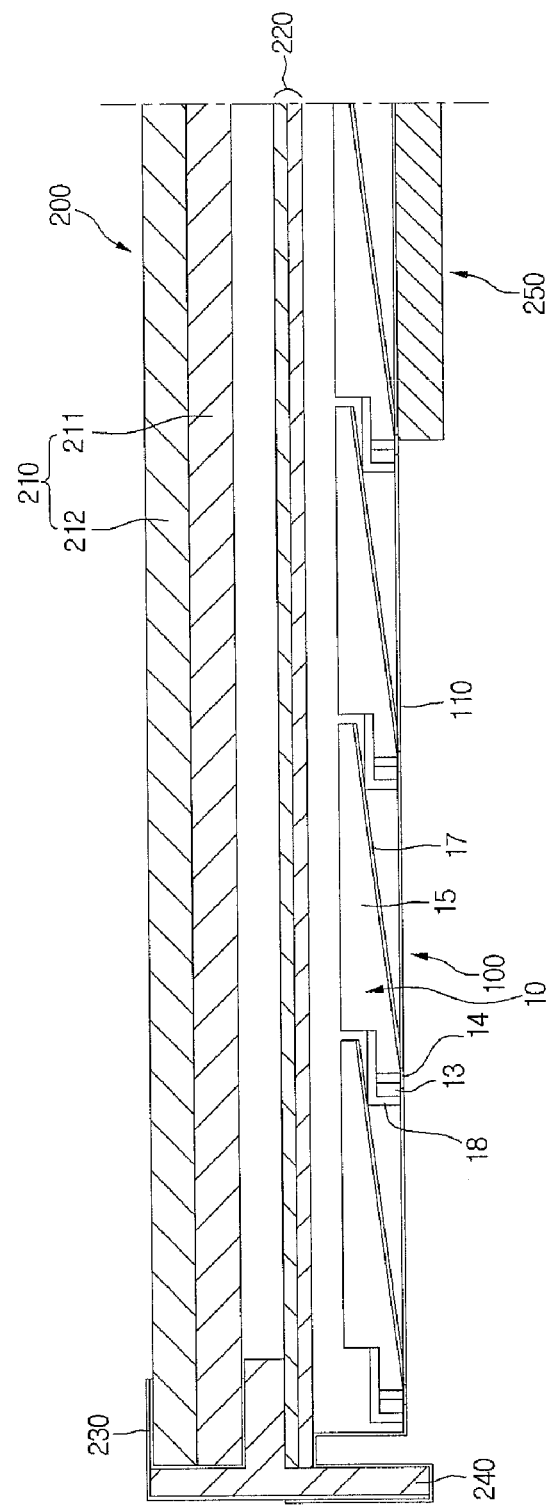
FIG. 2 is a cross-sectional view taken along line A-A of FIG. 1.

FIG. 2 is a cross-sectional view taken along line A-A of FIG. 1.

As shown in FIG. 2, the display module 200 may include a display panel 210 for displaying an image, a backlight unit 100 for emitting light to the display panel 210, a bottom cover 110 for providing a lower appearance of the display module 200, a panel supporter 240 for supporting the display panel 210 from a lower side, and a top cover 230 for supporting the display panel 210 from an upper side and constituting a border of the display module 200.

The bottom cover 110 may have a box shape with an open upper surface to receive the backlight unit 100. A side of the bottom cover 110 may be fixed or attached to a side of the top cover 230. For example, a coupling member such as a screw may pass through a side surface of the display module 200 (i.e., through a side where the bottom cover 110 overlaps the top cover 230 to fix or attach the bottom cover 110 and the top cover 230).

A rear surface of the bottom cover 110 may be provided with at least one substrate 250 to drive the display module 200 with a signal transmitted from the outside (e.g. an image signal).

The substrate 250 may be a driving part of an image panel and/or a backlight unit such as a timing controller, a T-con board, and/or a main printed circuit board (PCB), and may be fixed or attached to the rear surface of the bottom cover 110 through an adhesive member or a coupling member such as a screw.

For example, the display panel 210 may include a lower substrate 211 and an upper substrate 212 attached to each other with a constant cell gap, and a liquid crystal layer provided between the lower substrate 211 and the upper substrate 212. The lower substrate 211 may be provided with a plurality of gate lines and a plurality of data lines crossing the gate lines. Thin film transistors (TFTs) may be provided in crossing areas of the gate lines and the data lines.

The upper substrate 212 may be provided with color filters, although the structure of the display panel 210 is not limited thereto. For example, the lower substrate 211 may include color filters as well as TFTs. In addition, the structure of the display panel 210 may vary according to a method of driving the liquid crystal layer.

An edge of the display panel 210 may be provided with a gate driving printed circuit board (PCB) for supplying scan signals to the gate lines, and a data driving PCB for supplying data signals to the data lines. One of the upper side and the lower side of the display panel 210 may be provided with a polarized light filter (not shown).

The backlight unit 100 may include a plurality of optical assemblies 10 each including a light source 13, a substrate 14, a light guide plate (or panel) 15, a reflecting member 17, and a fixing bracket 18. An optical sheet 220 may be provided between the display panel 210 and the optical assemblies 10.

The optical sheet 220 may be removed, although embodiments are not limited thereto. The optical sheet 220 may include at least one of a spread sheet (not shown) or a prism sheet (not shown).

The spread sheet may uniformly spread light emitted from the light guide plate 15, and the spread light may be collected to the display panel 210 through the prism sheet. The prism sheet may include one or more illumination enhancement films and at least one of a horizontal prism sheet or a vertical prism sheet may be selectively provided.

The type and number of optical sheets may vary.

The optical assemblies 10 may be provided under the display panel 210 and the optical sheet 220 to emit light upward to the display panel 210.

The configuration of the optical assembly 10 may now be described in more detail.

Figure 3:
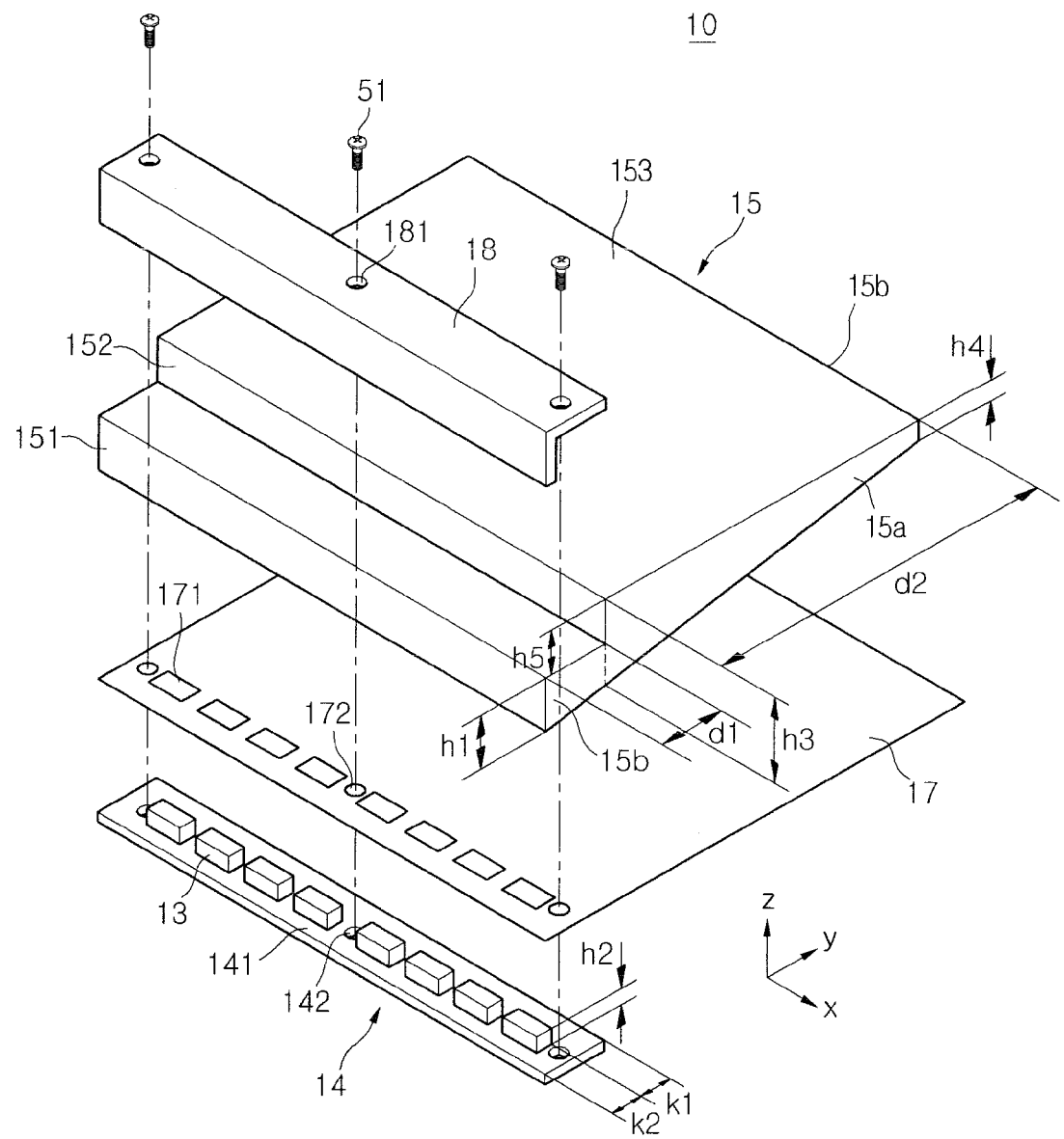
FIG. 3 is an exploded perspective view illustrating an optical assembly of FIG. 1.

FIG. 3 is an exploded perspective view illustrating the optical assembly 10.

As shown in FIGS. 2 and 3, the optical assemblies 10 may be arrayed with at least one portion fixed to the bottom cover 110. Each of the optical assemblies 10 may include the light source 13, the substrate 14, the light guide plate 15, the reflecting member 17, and the fixing bracket 18.

The light source 13 may be provided in plurality. The light source 13 may be disposed in a left-and-right direction (x-axis direction) at a side surface of the light guide plate 15. Thus, light emitted from the light source 13 may be incident to a side surface of the light guide plate 15.

The light source 13 may include a light emitting diode (LED) that may be provided in plurality.

The LED may be a side illumination-type LED that is configured to laterally emit light. The LED may also be a color LED emitting at least one of red, blue, and green light, or a white LED in which a yellow fluorescent material is applied to a blue LED.

The LEDs may be provided on the upper surface of the substrate 14, and may emit light having a wavelength ranging from about 430 nm to 480 nm. A fluorescent material may be applied on a light emitting surface of the LED to transmit light emitted from the LED.

The color LED may include at least one of a red LED, a blue LED, or a green LED. Arrangement and light types of the LEDs may vary.

The light sources 13 may be mounted to a substrate body 141 of the substrate 14 longitudinally extending in the left-and-right direction (x-axis direction), and provided on the rear side of the substrate body 141 in a back-and-forth direction (y-axis direction).

That is, the light source 13 may be mounted to a rear area k2 of the substrate body 141 in the back-and-forth direction. A front area k1 may be provided in front of the rear area k2, and the front area k1 may be greater than the rear area k2.

The front area k1 may have a support space with a predetermined size for supporting at least one of the light guide plate 15 and the reflecting member 17. As the size of the rear area k2, just having a width for mounting the light sources 13, is decreased, a bezel area of the display module 200 where the rear area k2 is provided (i.e., the width of the border of the display module 200) may decrease. Accordingly, the width of the rear area k2 may be minimized.

The forward direction of the back-and-forth direction (y-axis direction) may be the direction (+y-axis direction) of light emitted from the light sources 13, and the rearward direction thereof may be the direction (−y-axis direction) opposite to the forward direction.

The substrate body 141 may include through holes 142 through which coupling members 51 pass.

The through holes 142 may be provided between the light sources 13. The through holes 142 may be provided in the left and right sides of the substrate body 141 and in the middle of the substrate body 141 with the light sources 13 (such as four light sources) on each lateral side of the middle.

The coupling member 51 may pass through the fixing bracket 18, the reflecting member 17, and the substrate 14 to coordinate a configuration of the optical assembly 10 and to attach the optical assembly 10 to the bottom cover 110.

The light guide plate 15 may be transparent. For example, the light guide plate 15 may be formed of one of acryl-based resin such as polymethyl metaacrylate (PMMA), polyethylene terephthlate (PET), poly carbonate (PC), and/or polyethylene naphthalate (PEN). The light guide plate 15 may be formed using an extrusion molding method.

The light guide plate 15 may diffuse light emitted from the light source 13 to guide the light upward.

Light incident forward (y-axis direction) from the light source 13 (i.e., laterally from the light source 13) may be refracted and diffused upward (z-axis direction), that is to the display panel 210 by the light guide plate 15. The lower surface of the light guide plate 15 may be inclined upward in the forward direction to efficiently emit laterally incident light upward.

At least one of the lower surface of the light guide plate 15 may be placed on and supported by the front area k1 of the substrate body 141.

The light guide plate 15 may include a light incident part 15b having a light incident surface 151 facing the light source 13, and a light emitting part 15a extending forward from the light incident part 15b.

The rear side of the light guide plate 15 where the light incident surface 151 is provided may be referred to as a first side, and a front end 155 of the light guide plate 15 may be referred to as a second side.

A plurality of streaks of light incident from the light sources 13 into the light guide plate 15 through the light incident surface 151 may be mixed into a single streak of light through the light incident part 15b, and then the single streak of light may be spread through the light emitting part 15a and emitted to the upper side of the light guide plate 15.

A first side of the light emitting part 15a may be connected to a second side of the light incident part 15b. Light mixed in the light incident part 15b may be emitted upward, that is through an upper surface 153 of the light emitting part 15a.

A vertical height h2 of a light emitting surface of the light source 13 emitting light may be substantially equal to or less than a vertical height h1 of the light incident surface 151 of the light incident part 15b.

When the height h2 of the light sources 13 are greater than the vertical height h1 of the light incident surface 151, a portion of light emitted from the light emitting surfaces of the light sources 13 may not be incident to the light incident surface 151, but may be leaked out.

Since the light sources 13 emit light (e.g. with an orientation angle of about 90° or greater), the height h1 of the light incident surface 151 may be greater than the height h2 of the light sources 13.

However, when the height h1 of the light incident surface 151 is greater than two times the height h2 of the light sources 13, light leak prevention and light efficiency increase may not be achieved anymore. Rather, excessive light diffusion may decrease light efficiency.

Thus, the height h1 of the light incident surface 151 may be equal to the height h2 of the light sources 13, or may be less than two times the height h2 of the light sources 13.

The light incident part 15b may extend with a predetermined distance (d1) in the forward direction (y-axis direction), and the light emitting part 15a may extend with a predetermined distance d2 in the forward direction from the light incident part 15b. Thus, the back-and-forth length of the light guide plate 15 including the light incident part 15b and the light emitting part 15a may be equal to a sum d3 of the back-and-forth lengths of the light incident part 15b and the light emitting part 15a.

A portion connecting the light incident part 15b to the light emitting part 15a may be provided with an inclined part (or stair part) due to height difference between an upper surface 152 of the light incident part 15b and the upper surface 153 of the light emitting part 15a.

At least one of the fixing bracket 18 may be in contact with the upper surface 152 of the light incident part 15b to press the upper surface 152 of the light incident part 15b downward, that is to the substrate body 141 and the bottom cover 110 so as to firmly fix or attach the light guide plate 15 to the bottom cover 110.

A height h5 of the inclined part may be greater than or equal to a height h4 of a second end 156 of the light incident part 15b.

The lower surface of the light guide plate 15 may be inclined upward from the light incident part 15b to the light emitting part 15a.

The thickness of the light guide plate 15 may gradually decrease from the light incident part 15b to the light emitting part 15a.

When the height h4 of the second end 156 is greater than the height h5 of the inclined part, the inclination angle of the lower surface of the light guide plate 15 may decrease. This may reduce reflectance of the light guide plate 15, thus decreasing the upward light emitting efficiency of the light emitting part 15a.

Light interference may occur in which light that does not pass through the upper surface 153 of the light emitting part 15a may be leaked into the adjacent light guide plate 15 through the second end 156. The height h4 of the second end 156 of the light emitting part 15a may be less than or equal to the height h5 of the inclined part.

When the height h1 of the light incident surface 151 is less than the height h5 of the inclined part, light traveling from the light incident part 15b to the light emitting part 15a may be excessively diffused so that a dark region may be generated on the first side of the light emitting part 15a contacting the light incident part 15b. Thus, the height h1 of the light incident surface 151 may be greater than or equal to the height h5 of the inclined part.

From the relationship between the height h1 of the light incident surface 151 and the height h5 of the inclined part, and from the relationship between the height h5 of the inclined part and the height h4 of the second end 156 of the light emitting part 15a, the height h1 of the light incident surface 151 may be equal to or greater than the height h4 of the second end 156.

The vertical height h1 of the light incident surface 151 of the light incident part 15b may be less than a vertical height h3 of a first end of the light emitting part 15a connected to the light incident part 15b.

In the example where streaks of light incident from the light sources 13 into the light guide plate 15 through the light incident part 15b are mixed into a single streak of light, when the single streak of light travels to the first end of the light emitting part 15a having the greater cross section than the light incident surface 151, the single streak of light may be spread more widely.

A vertical height h4 of the front end 155 of the light emitting part 15a may be less than the vertical height h1 of the light incident surface 151 of the light incident part 15b, and may be less than the vertical height h3 of the first end of the light emitting part 15a.

The vertical cross section of the light emitting part 15a of the light guide plate 15 where light incident through the light incident surface 151 is emitted upward may decrease so as to improve upward emission of light.

The lower surface of the light guide plate 15 may be provided with the reflecting member 17 to reflect light upward.

The reflecting member 17 may include a reflecting sheet having a predetermined reflectance or greater. A portion of the reflecting member 17 contacting the lower surface of the light guide plate 15 may be greater than the lower surface of the light guide plate 15 in a left-and-right width and a back-and-forth width.

The reflecting member 17 may be greater in area than the lower surface of the light guide plate 15. When the light guide plate 15 is provided to the lower surface of the light guide plate 15, the light guide plate 15 may protrude from the left, right and/or front sides of the light guide plate 15.

Fixing holes 171, through which the light sources 13 respectively pass, may be provided in one side of the reflecting member 17 (i.e., on the rear side of the light guide plate 15) to fix or attach the reflecting member 17 to the substrate 14. The fixing holes 171 passing through the reflecting member 17 may have sizes corresponding to the light sources 13. Through holes 172 may be provided between the fixing holes 171 at positions corresponding to the through holes 142 of the substrate 14.

The fixing bracket 18 may be provided at the first side of the light guide plate 15 (i.e., at the upper surface of the light incident part 15b) so as to fix or attach the light guide plate 15 to the bottom cover 110. The fixing bracket 18 may press at least one portion of the light guide plate 15 to the bottom cover 110 to fix or attach the light guide plate 15.

The fixing bracket 18 may include a frame structure with a bent upper portion, and may be formed of synthetic resin through injection molding, or may be of metal. The bent upper portion of the fixing bracket 18 may be provided with through holes 181 through which the coupling members 51 pass.

When the fixing bracket 18 is fixed or attached to the bottom cover 110 through the coupling members 51, the light sources 13 may be provided in the fixing bracket 18, thus preventing light from being emitted from the light source 13 to the outside without passing through the light guide plate 15.

When a first one of the optical assemblies 10 is adjacent to a second one of the optical assemblies 10, at least one portion of the light guide plate 15 of the first optical assembly 10 may overlap, from the upper side, the fixing bracket 18 of the second optical assembly 10.

At least one portion of the light emitting part 15a of the optical assembly 10 may be provided above the fixing bracket 18 and the light incident part 15b of the adjacent optical assembly 10 so that the optical assemblies 10 may overlap each other.

The display panel 210 may have a plurality of division areas corresponding to the light guide plates 15. The intensity of light emitted from the light guide plate 15 of the optical assembly 10 (i.e., the brightness of light emitted from the light guide plate 15) may be adjusted according to a gray peak value or a color coordinate signal of the corresponding division area so as to adjust the brightness of the display panel 210.

Figure 4:
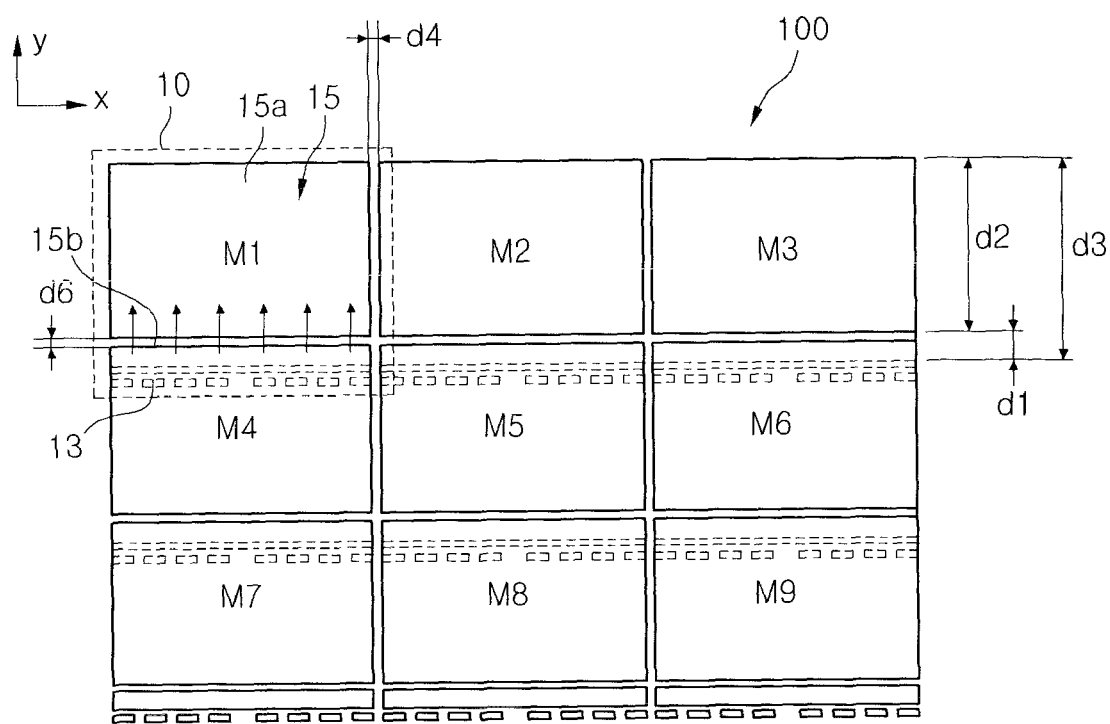
FIG. 4 is a plan view illustrating a backlight unit.

FIG. 4 is a plan view illustrating the front side of the backlight unit 100. FIG. 4 may not include the fixing bracket 18 for fixing or attaching the light guide plate 15 to the bottom cover 110.

Figure 5:
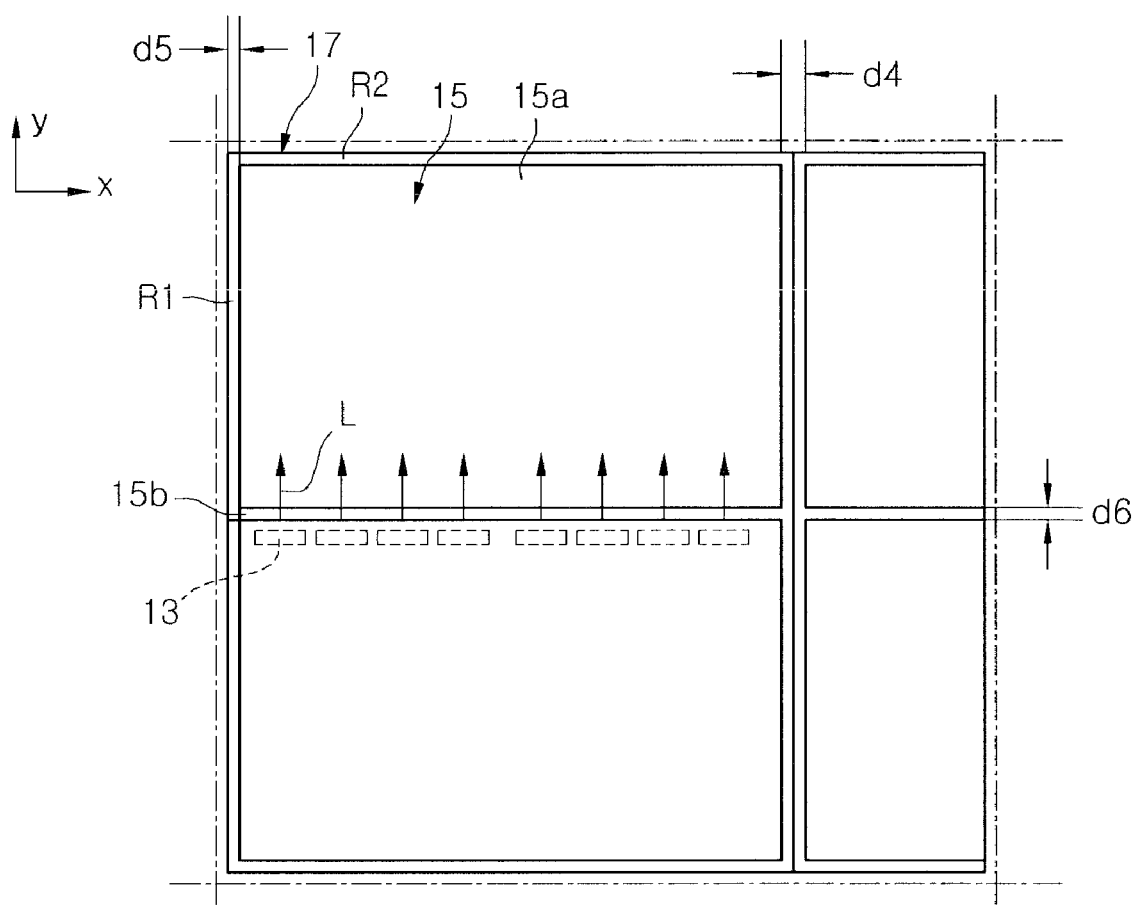
FIG. 5 is an enlarged view illustrating a portion B of FIG. 4.

FIG. 5 is an enlarged view illustrating a portion B of FIG. 4.

As shown in FIGS. 4 and 5, the optical assemblies 10 of the backlight unit 100 may be arrayed in an N×M matrix, where N is a number of rows arrayed along the y-axis direction, M is a number of columns arrayed along the x-axis direction, and M and N are natural numbers equal to 2 or greater. Each of the optical assemblies 10 may include the light sources 13 and the light guide plate 15.

For example, the number of rows of the light guide plates 15 arrayed along the y-axis direction may be N, where N is 2 or greater. The second end 156 of the light emitting part 15a of the light guide plate 15 in a $K^{th}$ row (K is one of 1 to N−1) of the N rows is provided above the light incident part 15b of the light guide plate 15 in a $K+1^{th}$ row so that the two adjacent light guide plates 15 can overlap each other in at least one portion.

The number of the light guide plates 15 arrayed in the longitudinal direction of the substrate 14 (i.e., the x-axis direction) may be M.

Although the single substrate 14 may correspond to the single light guide plate 15, the substrate 14 may correspond to the light guide plates 15.

Each of the optical assemblies 10 may be driven in an edge-type backlight manner and may operate as a single light source. The optical assemblies 10 may be arrayed in a direct-type backlight manner to constitute the backlight unit 100. Thus, the example that the LEDs are detected as a hot spot on a screen may be prevented, and a thickness of the light guide plate 15 and a number of optical films may be reduced to achieve slimness of the backlight unit 100.

For example, the backlight unit 100 may include the nine optical assemblies 10 (M1 to M9) in a 3×3 matrix as shown in FIG. 3, although embodiments are not limited thereto. Thus, the matrix of the optical assemblies 10 may vary according to a screen size of a display apparatus.

The back-and-forth length (y-axis direction) of the light guide plate 15 may be less than the left-and-right length (x-axis direction) in which the light sources 13 are arrayed.

Each of the optical assemblies 10 may be manufactured as a discrete assembly, and the optical assemblies 10 may be adjacent to each other to constitute a module-type backlight unit that is a backlight member configured to provide light to the display panel 210.

The backlight unit 100 may be driven using an entire driving method or a local driving method such as a local dimming method and an impulsive method. The method of driving the LEDs may vary according to a circuit design, and thus may not be limited. A color contrast ratio may increase, and a bright region and a dark region can be sharply expressed on a screen, thereby improving image quality.

The backlight unit 100 may be operated by a plurality of division driving areas corresponding to the light guide plates 15, and the brightness of the division driving area may be linked with brightness corresponding to an image signal. Thus, the brightness in a dark portion of an image may decrease, and the brightness in a bright portion of the image may increase so as to improve a contrast ratio and sharpness of the image.

For example, a portion of the optical assemblies 10 (M1 to M9) may be independently driven to emit light. The respective light sources 13 of the optical assemblies 10 may be independently controlled.

An area of the display panel 210 corresponding to one of the optical assemblies 10 or one of the light guide plates 15 may be divided into two or more blocks, and the display panel 210 and the backlight unit 100 may be dividedly driven in a block unit.

The optical assemblies 10 may be spaced predetermined distances d4 and d6 from each other as shown in FIGS. 4 and 5. For example, the light guide plates 15 adjacent in the left-and-right direction (x-axis direction) may be spaced from each other by the distance d4, and the light guide plates 15 adjacent in the back-and-forth direction (y-axis direction) may be spaced from each other by the distance d6.

When an $L^{th}$ one of the M light guide plates 15 arrayed in the x-axis direction is adjacent to an $L+1^{th}$ one, the $L+1^{th}$ light guide plate 15 may be spaced apart by the distance d4 from the $L^{th}$ light guide plate 15.

When edges of the light guide plates 15 of the adjacent optical assemblies 10 are in contact with each other, light emitted from the light sources 13 may thermally expand the light guide plates 15, the light guide plates 15 may be out of coordinated positions, and/or the light guide plate may be deformed by contact stress therebetween.

When the edges of the light guide plates 15 are in contact with each other, luminance of edges having a high light emittance may be greater than luminance of the remainder of the light guide plate 15. Thus, a mesh of bright lines corresponding to the edges of the light guide plates 15 may occur on a display screen.

The adjacent optical assemblies 10 may be spaced from each other by the distance d4 in the left-and-right direction (x-axis direction) and by the distance d6 in the back-and-forth direction (y-axis direction), so as to space the edges of the adjacent optical assemblies 10 apart from each other.

When the distances d4 and d6 are excessively increased, luminance of the distances d4 and d6 may be less than luminance of the remainder of the light guide plate 15. Thus, the distances d4 and d6 between the light guide plates 15 should be within a predetermined range.

Accordingly, the lateral distance d4 of the light guide plates 15 may range from about 0.1 mm to 5 mm, and the longitudinal distance d6 of the light guide plates 15 may range from about 0.1 mm to 7 mm.

Since the distance between the front edge of the light guide plate 15 and the light sources 13 is greater than the distance between the left or right edge of the light guide plate 15 and the light sources 13, luminance of the front edge may be less than luminance of the left and right edges.

The distance d6 of the light guide plates 15 may be equal to or less than the distance d4.

When edges of the adjacent light guide plates 15 are spaced from each other by the distances d4 and d6, the reflecting member 17 provided to the lower surface of the light guide plate 15 may be in contact with the reflecting member 17 of the adjacent light guide plate 15 to continuously reflect light.

The reflecting members 17 constitute a continuous shape as a whole in the manner where the edge of one of the reflecting members 17 is in contact with the edge of the adjacent reflecting member 17.

An edge of the reflecting member 17 provided to one of the light guide plates 15 may protrude a protruding distance d5, which is half the distance d4, from the left and right edges of the light guide plate 15. An edge of the reflecting member 17 provided to one of the light guide plates 15 may protrude a predetermined distance, which is half the distance d6, from the front edge of the light guide plate 15.

The edges of the reflecting members 17 may be provided between the adjacent light guide plates 15.

The luminance of the edges of the light guide plate 15 may be uneven according to spacing conditions of the front, left and right edges of the light guide plate 15 from the light sources 13.

When luminance of the edges of the light guide plate 15 is uneven, the edges of the reflecting member 17 adjacent to the edges of the light guide plate 15 and protruding outward may be provided with a low-reflectance part including a plurality of optical elements (or optical patterns) for compensating for the uneven luminance.

The reflecting member 17 may be divided into a first region overlapping the light guide plate 15, and a second region that does not overlap the light guide plate 15. For example, the low-reflectance part may be provided in the second region. The reflecting member 17 may include the first region having a first reflectance and the second region having a second reflectance that is different than the first reflectance.

The optical elements (or patterns) may be provided in a region of the reflecting member 17 corresponding to the space between adjacent two of the light guide plates 15, that is in the boundary of the light guide plates 15.

Although the low-reflectance part is provided only in the second region, the low-reflectance part may be provided in both the second region and at least one portion of the first region adjacent to the second region, or the low-reflectance part may be provided at an edge of the first region facing an edge of the lower surface of the light guide plate 15.

The configuration of the low-reflectance part provided at the edges of the reflecting member 17 may now be described in detail.

Figure 6:
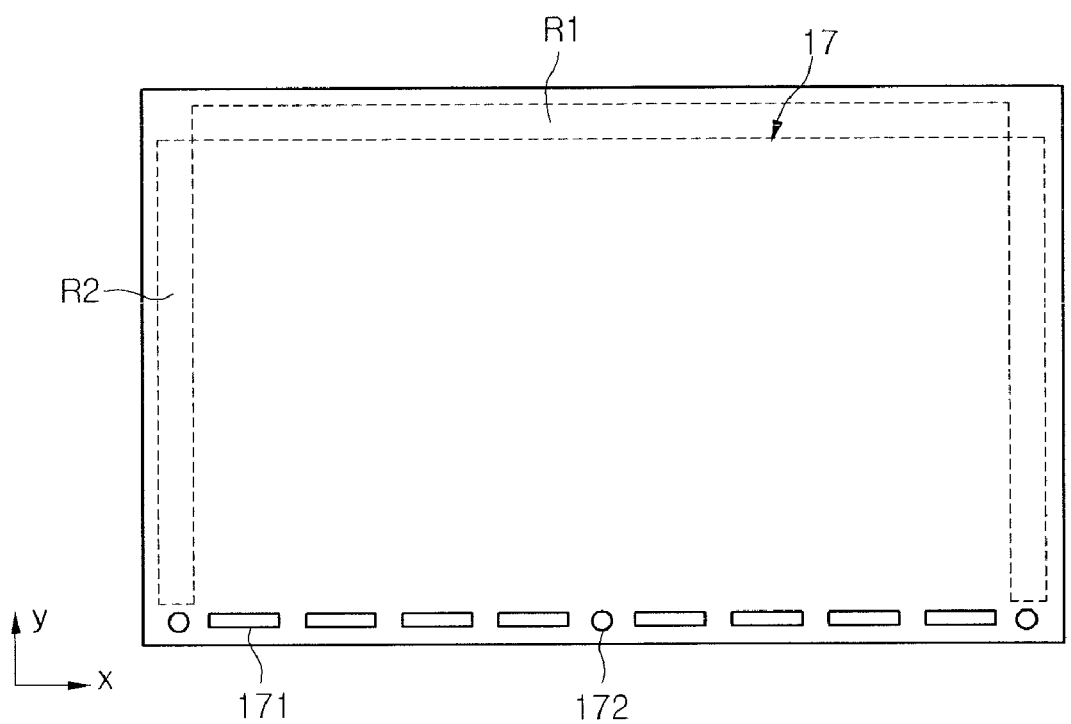
FIG. 6 is a plan view illustrating a reflecting member of FIG. 3.
Figure 7:
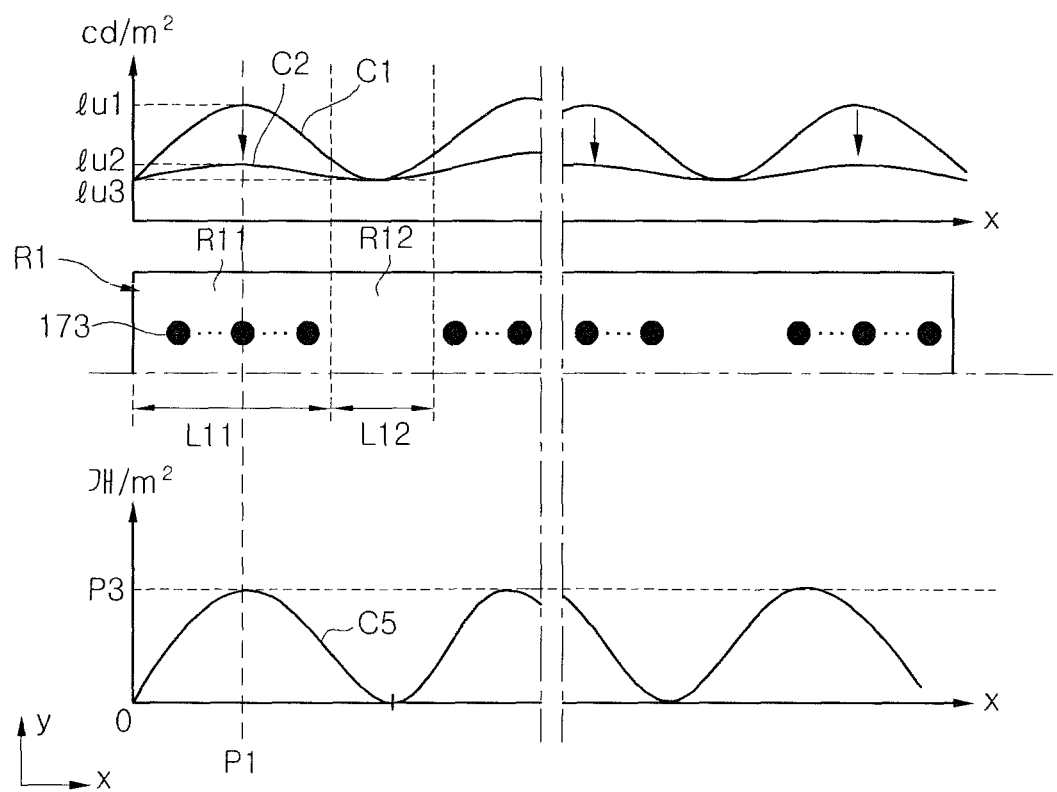
FIG. 7 is a graph illustrating a first low-reflectance part of FIG. 6 and luminance distribution of the first low-reflectance part.
Figure 8:
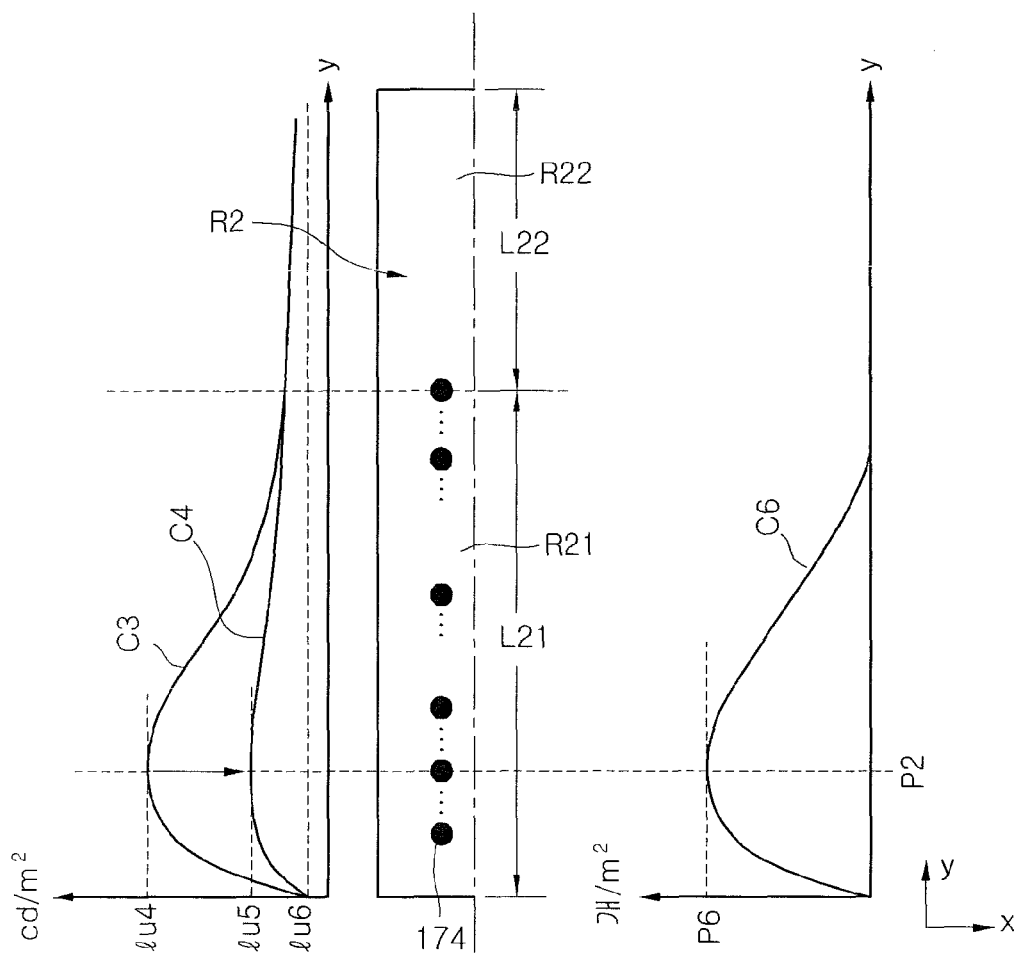
FIG. 8 is a graph illustrating a second low-reflectance part of FIG. 6 and luminance distribution of the second low-reflectance part.

FIG. 6 is a plan view illustrating the reflecting member 17. FIG. 7 is a graph illustrating a first low-reflectance part R1 of FIG. 6 and a luminance distribution of the first low-reflectance part R1. FIG. 8 is a graph illustrating a second low-reflectance part R2 of FIG. 6 and luminance distribution of the second low-reflectance part R2.

As shown in FIG. 6, the first low-reflectance part R1 may be provided at the front edge of the reflecting member 17, and the second low-reflectance part R2 may be provided at each of the left and right edges of the reflecting member 17.

The first and second low-reflectance parts R1 and R2 may protrude outward from the edges of the light guide plate 15 and may be exposed to the outside between the light guide plates 15.

The first and second low-reflectance parts R1 and R2 may include a plurality of optical elements (or patterns) to adjust reflectance of the reflecting member 17, thus compensating for uneven luminance of the edges of the reflecting members 17 between the light guide plates 15.

The configuration of the first low-reflectance part R1 may now be described in more detail.

As shown in FIGS. 6 and 7, the first low-reflectance part R1 may extend in the left-and-right direction at the front edge of the reflecting member 17. That is, the first low-reflectance part R1 may extend in the direction in which the light sources 13 are arrayed on the substrate 14.

The first low-reflectance part R1 may include a plurality of first low-reflectance elements (or patterns) 173 that are provided based on the luminance distribution of the front edge of the light guide plate 15. The first low-reflectance elements 173 may be holes that pass through the first low-reflectance part R1.

In the graph showing a first luminance distribution curve C1, a horizontal axis may denote a length in the left-and-right direction (x-axis direction), and a vertical axis may denote a luminance value. Luminance may have a unit of $cd/m^2$, which may denote luminous intensity per unit area.

A region where the density of the first low-reflectance elements 173 is high may have a low reflectance, and a region where the density of the first low-reflectance elements 173 is low may have a high reflectance. A region without the first low-reflectance element 173 may have the reflectance of the reflecting member 17.

A plurality of first pattern center points P1 respectively corresponding to the light sources 13 may be respectively provided at positions where the first low-reflectance part R1 is in contact with imaginary lines respectively extending from the light sources 13 to the front side (i.e., to the front edges of the light guide plate 15 and the reflecting member 17). The first low-reflectance elements 173 may be provided on the left and right sides of the first pattern center points P1.

The density of the first low-reflectance elements 173 provided around the first pattern center point P1 may be greater than the density of the first low-reflectance elements 173 provided to the remainder of the first low-reflectance part R1 except for the first pattern center point P1.

The density of the first low-reflectance elements 173 may gradually decrease toward the left and right sides of the first pattern center point P1.

Referring to FIG. 7, the first luminance distribution curve C1 of the front edge of the light guide plate 15 may have a first maximum luminance value lu1 at positions respectively facing the light sources 13 (i.e., at the first pattern center points P1), and may decrease in luminance value toward the left and right sides of the first pattern center points P1.

A luminance value in the middle between the position of the light guide plate 15 facing one of the light sources 13 and the position facing the adjacent light source 13 may be lowest, which may be referred to as a first minimum luminance value lu3.

This may be caused by the rectilinear propagation of light emitted from the light source 13. In other words, this may be because the amount of light arriving at a position adjacent to the light source 13 may be greater than the amount of light arriving at a position distant from the light source 13.

When the difference between the first maximum luminance value lu1 and the first minimum luminance value lu3 is greater than a predetermined value, a bright line may partially occur at the edge of the light guide plate 15.

The density of the first low-reflectance elements 173 provided around the first pattern center point P1 provided at a position having a maximum luminance value in the front edge of the light guide plate 15 may have a first maximum density value P3 and the lowest reflectance of the first low-reflectance part R1, and the density of the first low-reflectance elements 173 may decrease toward the left and right sides of the first pattern center points P1, so as to gradually increase the reflectance of the first low-reflectance part R1.

An area corresponding to the middle between the first pattern center points P1 may be provided with a first full-reflectance region R12 without the first low-reflectance element 173. Thus, light may be reflected from the area having the first minimum luminance value lu3 without decreasing the reflectance of the reflecting member 17.

As compared with the first full-reflectance region R12, an area provided with the first low-reflectance elements 173 may be referred to as a first low-reflectance region R11.

The first low-reflectance region R11 and the first full-reflectance region R12 may have a length L11 and a length L12 in the left-and-right direction, respectively. The first full-reflectance region R12 may be provided in a portion of the first low-reflectance part R1 between the light sources 13.

Since the first low-reflectance elements 173 are provided at the first low-reflectance part R1, the reflectance of a portion of the reflecting member 17 may decrease according to the first luminance distribution curve C1.

Thus, in a space corresponding to the distance d6 between the front edge of the light emitting part 15a of the light guide plate 15 and the rear edge of the light emitting part 15a of the adjacent light guide plate 15, a first apparent luminance distribution curve C2 may decrease in deviation between the first minimum luminance value lu3 and a maximum luminance value lu2, relative to the first luminance distribution curve C1.

The difference between the maximum luminance value lu2 of the first apparent luminance distribution curve C2 and the first minimum luminance value lu3 may range from about 0% to 5% of the first minimum luminance value lu3.

The configuration of the second low-reflectance part R2 may now be described.

Referring to FIGS. 6 and 8, the second low-reflectance parts R2 may extend in the back-and-forth direction at the left and right edges of the reflecting member 17. The second low-reflectance parts R2 may extend in the direction crossing the extending direction of the first low-reflectance part R1.

The second low-reflectance part R2 may include a plurality of second low-reflectance elements (or patterns) 174 that are provided according to a second luminance distribution curve c3 of the left or right edge of the light guide plate 15. The second low-reflectance elements 174 may be minute holes passing through the second low-reflectance part R2, like the first low-reflectance elements 173.

In the graph showing the second luminance distribution curve C3, a vertical axis may denote a length in the back-and-forth direction (y-axis direction), and a horizontal axis may denote a luminance value at the left and right edges of the light guide plate 15.

A region where the density of the second low-reflectance elements 174 is high may be less in reflectance than a region where the density of the second low-reflectance elements 174 is low, like the arrangement of the first low-reflectance elements 173. A region without the second low-reflectance element 174 may have the reflectance of the reflecting member 17.

The second low-reflectance part R2 may be provided with a second pattern center point P2 that is adjacent to the rear side of the light guide plate 15 with respect to the middle of the length of the light guide plate 15 in the back-and-forth direction.

When the distance from a first position of an edge of the reflecting member 17 where one side (on which the light incident surface 151 is provided) of the light guide plate 15 is provided to a second position of the edge of the reflecting member 17 where the second end 156 of the light guide plate 15 is disposed is set as 100%, the second pattern center point P2 may be provided at any one position of a region ranging from about 10% to 40% from the first position.

The second low-reflectance elements 174 may be provided on the front and rear sides of the second pattern center point P2. A region where the second low-reflectance elements 174 are provided on the front side is greater than a region where the second low-reflectance elements 174 are provided on the rear side.

The density of the second low-reflectance elements 174 provided on the front and rear sides of the second pattern center point P2 may decrease in the direction distant from the second pattern center point P2.

A density distribution curve C6 of the second low-reflectance elements 174 may have a second maximum density value P6 at the second pattern center point P2, and may decrease in density value to the front and rear sides of the second pattern center point P2.

Unlike the first pattern center points P1, the second pattern center point P2 may be provided singularly because luminance of the left and right edges of the light guide plate 15 may gradually decrease in the distant direction from the light sources 13.

Since a portion of the light guide plate 15 provided on the rear side of the second pattern center point P2 is included in the light incident part 15b where light is not completely spread, the portion of the light guide plate 15 provided on the rear side of the second pattern center point P2 may be less in the luminance of left and right edges than the second pattern center point P2 where streaks of light may be completely mixed.

Density of the second low-reflectance elements 174 provided on the rear side of the second pattern center point P2 at the light incident part 15b may be less than density of the second low-reflectance elements 174 provided around the second pattern center point P2.

The second luminance distribution curve C3 of the side edge of the light guide plate 15 may have a second maximum luminance value lu4 at a position of the side edge of the light guide plate 15 corresponding to the second pattern center point P2, and may decrease in luminance value toward the front end of the light emitting part 15a and the rear end of the light incident part 15b, so as to have a second minimum luminance value lu6.

A region where luminance is decreased toward the front side of the second pattern center point P2 may be greater than a region where luminance is decreased toward the rear side of the second pattern center point P2.

Since the second low-reflectance elements 174 are arranged around the second pattern center point P2, the reflectance of the reflecting member 17 may be adjusted according to the second luminance distribution curve C3 showing uneven luminance distribution.

Like the first low-reflectance part R1, in a space corresponding to the distance d4 between a side edge of the light guide plate 15 and a side edge of the adjacent light guide plate 15, a first apparent luminance distribution curve C4 may decrease in deviation between the second minimum luminance value lu6 and a maximum luminance value lu5, relative to the second luminance distribution curve C3.

The difference between the maximum luminance value lu5 of the second apparent luminance distribution curve C4 and the second minimum luminance value lu6 may range from about 0% to 5% of the second minimum luminance value lu6.

The second low-reflectance part R2 may include a second low-reflectance region R21 where the second low-reflectance elements 174 are provided, and a second full-reflectance region R22 without the second low-reflectance elements 174.

The second low-reflectance region R21 and the second full-reflectance region R22 may have lengths L21 and L22 in the back-and-forth direction of the second low-reflectance part R2, respectively.

Figure 9:
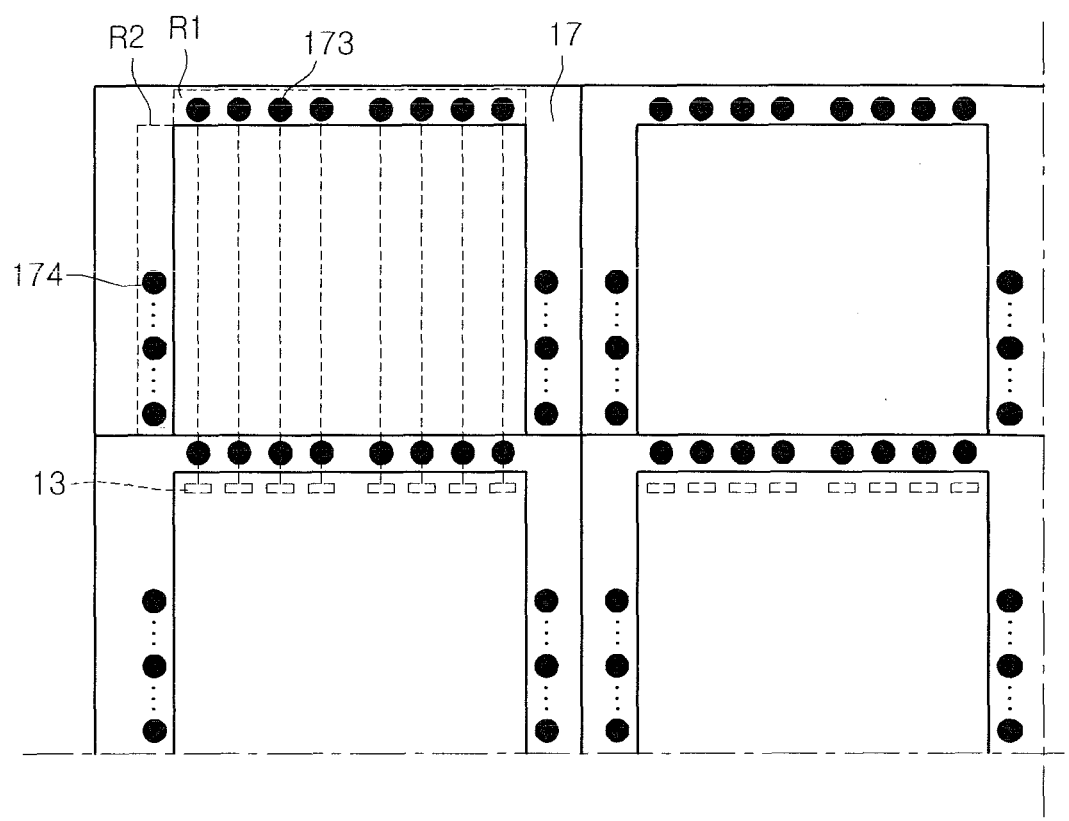
FIG. 9 is a schematic view illustrating an arrangement of the first and second low-reflectance parts of FIG. 6.

FIG. 9 is a schematic view illustrating an arrangement of the first and second low-reflectance parts R1 and R2.

As shown in FIG. 9, when the first low-reflectance part R1 is provided with the first low-reflectance elements 173, imaginary lines extending from the light sources 13 to the front side may meet portions where the first low-reflectance elements 173 are provided with the first maximum density value P3 (i.e., the first low-reflectance regions R11).

Each of portions of the first low-reflectance part R1 corresponding to the distances between the light sources 13 may be provided with the first full-reflectance region R12.

The second low-reflectance part R2 may be provided with the second low-reflectance elements 174, the density of which may decrease in the distant direction from the light source 13.

Although in this embodiment the density of the first and second low-reflectance elements 173 and 174 may decrease in the direction distant from the first and second pattern center points P1 and P2, the first and second low-reflectance elements 173 and 174 may be provided with a constant density in the first and second low-reflectance regions R11 and R21.

Although the first and second low-reflectance elements 173 and 174 may be through holes, any structure for decreasing or adjusting reflectance of the reflecting member 17 (e.g. a structure printed with color pigment) may be provided.

Although in this embodiment the first and second low-reflectance elements 173 and 174 are provided to the first and second low-reflectance parts R1 and R2 to decrease or adjust the reflectance of the reflecting member 17, reflectance enhancement elements may be provided to increase the reflectance of the reflecting member 17.

For example, the reflectance enhancement element (or pattern) may be formed by depositing a metal having a high reflectance on the reflecting member 17. For example, this may be a dark shape.

When the reflectance enhancement elements replace the first low-reflectance elements 173 and 174, the reflectance enhancement elements may be arranged in the opposite manner to the first and second low-reflectance elements 173 and 174.

The density of the reflectance enhancement elements provided to a region where the density of the first and second low-reflectance elements 173 and 174 is high may be low, and the density of the reflectance enhancement elements provided to a region where the density of the first and second low-reflectance elements 173 and 174 is low may be high.

The module-type backlight unit including the light guide plates may provide light to the display panel. Thus, thickness of the display apparatus may decrease, and contrast of a display image can be improved using the entire driving method or the local driving method such as the local dimming method and the impulsive method.

Since the backlight unit is driven using the local dimming method, the entire power consumption of the display apparatus can be reduced.

Since edges of the adjacent light guide panels may have uniform luminance distribution, a bright line may be prevented from occurring on the backlight unit to improve image quality of the display apparatus.

Figure 10:
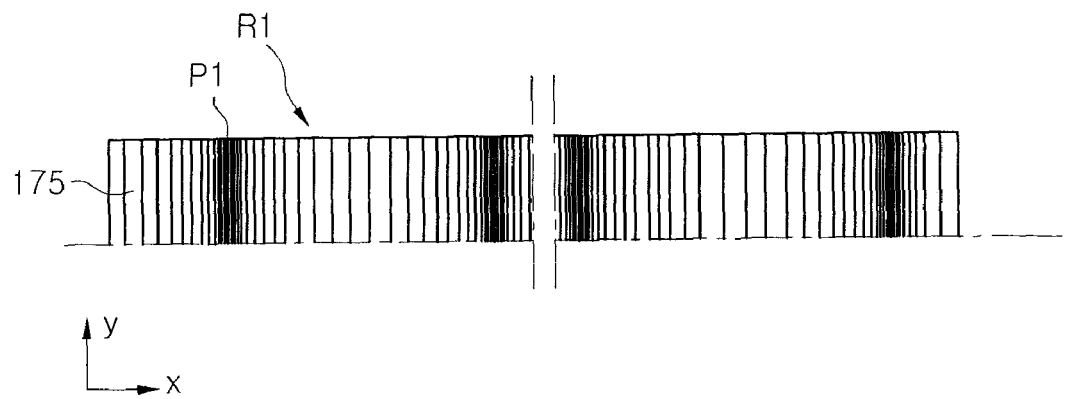
FIG. 10 is a schematic view illustrating a first low-reflectance part.
Figure 11:
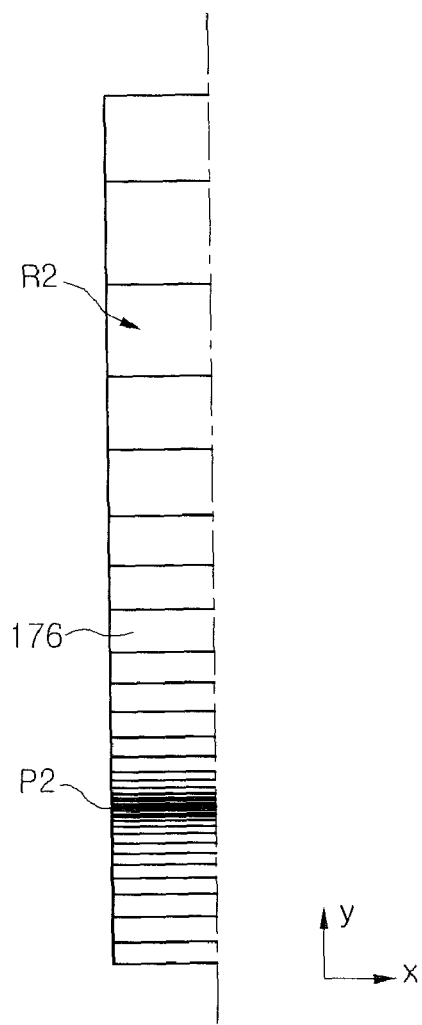
FIG. 11 is a schematic view illustrating a second low-reflectance part.

FIG. 10 is a schematic view illustrating the first low-reflectance part R1. FIG. 11 is a schematic view illustrating the second low-reflectance part R2.

This embodiment may be the same as the previous embodiment except for first low-reflectance elements 175 and second low-reflectance elements 176.

As shown in FIGS. 10 and 11, the first low-reflectance elements 175 and the second low-reflectance elements 176 may be formed of a color material that gradually increases or decreases in concentration.

The first and second low-reflectance elements 175 and 176 may be gradation patterns in which concentration may decrease in the distant directions from the first and second pattern center points P1 and P2.

The first and second low-reflectance elements 175 and 176 may be formed by printing or depositing a color material, such as a black material, on outer surfaces of the first and second low-reflectance parts R1 and R2.

Figure 12:
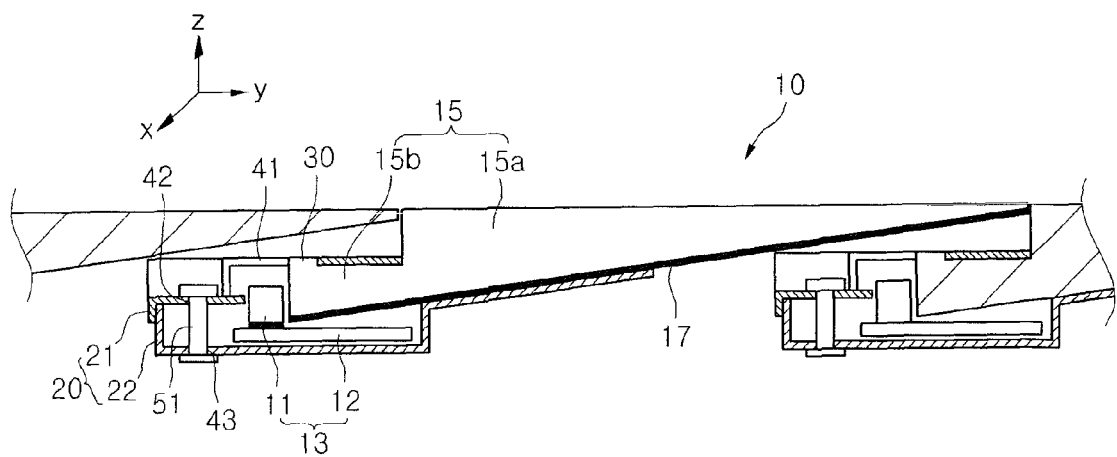
FIG. 12 is a cross-sectional view illustrating a backlight unit.
Figure 13:
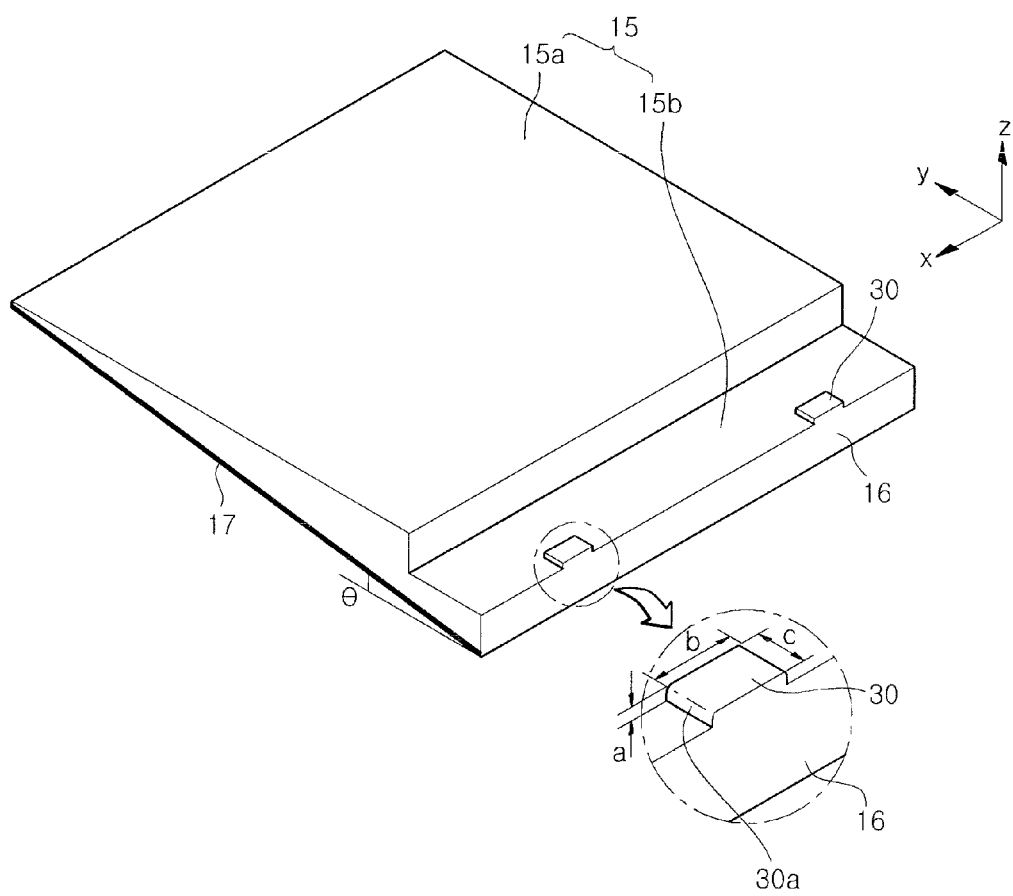
FIG. 13 is a perspective view illustrating a light guide plate of FIG. 12.

FIG. 12 is a cross-sectional view illustrating a backlight unit. FIG. 13 is a perspective view illustrating the light guide plate 15 of FIG. 12.

In FIGS. 12 and 13, a description of the same part as those of FIGS. 1 to 9 may be omitted.

As shown in FIGS. 12 and 13, the optical assembly 10 may include the light source 13, the light guide plate 15, the reflecting member 17, and a side cover 20 for fixing or attaching the light source 13 and the light guide plate 15.

The side cover 20 may provide a fixing position with respect to the bottom cover 110 and surround the light source 13 and a portion of the light guide plate 15. The light source 13 may be provided in the side cover 20

The side cover 20 may include a first side cover 21 provided on the light source 13 and the light incident part 15b of the light guide plate 15, and a second side cover 22 provided under the light incident part 15b. The side cover 20 may be formed of plastic or metal.

The first side cover 21 may be coupled to the second side cover 22 through a first fixing member 51 to prevent shaking of the light source 13 and the light guide plate 15 due to external shock, and more particularly to prevent shaking along the z-axis.

The second side cover 22 may support the inclined surface of the light guide plate 15 to firmly maintain alignment of the light guide plate 15 with the light source 13 and protect the light guide plate 15 and the light source 13 from external shock.

The light incident part 15b of the light guide plate 15 may include a protrusion 30 protruding with a predetermined height 'a'. The protrusion 30 may be provided to at least two points in the x-axis direction on the upper surface of the light incident part 15b of the light guide plate 15.

The shape of the protrusion 30 may vary. For example, the protrusion 30 may have a rectangular parallelepiped shape. The protrusions 30 may be caught by the first side cover 21 to prevent shaking of the light guide plate 15 along the x-axis and the y-axis.

An edge 30a of the protrusion 30 may be rounded to prevent a crack from being formed at the protrusion 30 by shock due to movement of the light guide plate 15.

The height 'a' of the protrusion 30 may range from about 0.3 mm to 0.6 mm from the upper surface of the first part light incident part 15b. The protrusion 30 may have a width 'b' ranging from about 2 mm to 5 mm along the x-axis. The protrusion 30 may have a width 'c' ranging from about 1 mm to 3 mm along the y-axis.

The protrusion 30 may be provided between neighboring LEDs 11 and adjacent to a light incident surface 16 on the upper surface of the light incident part 15b, so as to prevent optical interference of light emitted from the LEDs 11 due to the protrusion 30 integrally formed with the light guide plate 15.

The LEDs 11 may be spaced a predetermined distance from each other. The LEDs 11 may be provided in an oblique direction with respect to the protrusion 30 to minimize optical effect due to the protrusion 30 of the light guide plate 15. Accordingly, the distance between the LEDs 11 around the protrusion 30 may be greater than the distance between the other LEDs 11.

The distance between a portion of the LEDs 11 may be greater than the distance between the other LEDs 11 to secure a coupling space of the first side cover 21 and the second side cover 22 and minimize optical effect due to coupling force for pressing the light guide plate 15.

The first side cover 21 may have first holes 41 at positions corresponding to the protrusions 30 of the light incident part 15b.

The first holes 41 may be larger than the protrusions 30 such that the protrusions 30 may be fitted and caught to the first holes 41. The protrusion 30 provided in the first hole 41 may partially have a predetermined gap that may be a margin for preventing torsion of the light guide plate 15 when the light guide plate 15 is expanded by environmental change such as a sharp temperature increase. The rest of the protrusion 30 without the predetermined gap may be in contact with the first side cover 21 to increase a fixing force thereof.

At least one second hole 42 may be further provided in the first side cover 21. The second side cover 22 may have at least one third hole 43 at a position corresponding to the second hole 42.

The backlight unit 100 as described above may be provided in the bottom cover 110 having a box shape with an open top.

Figure 14:
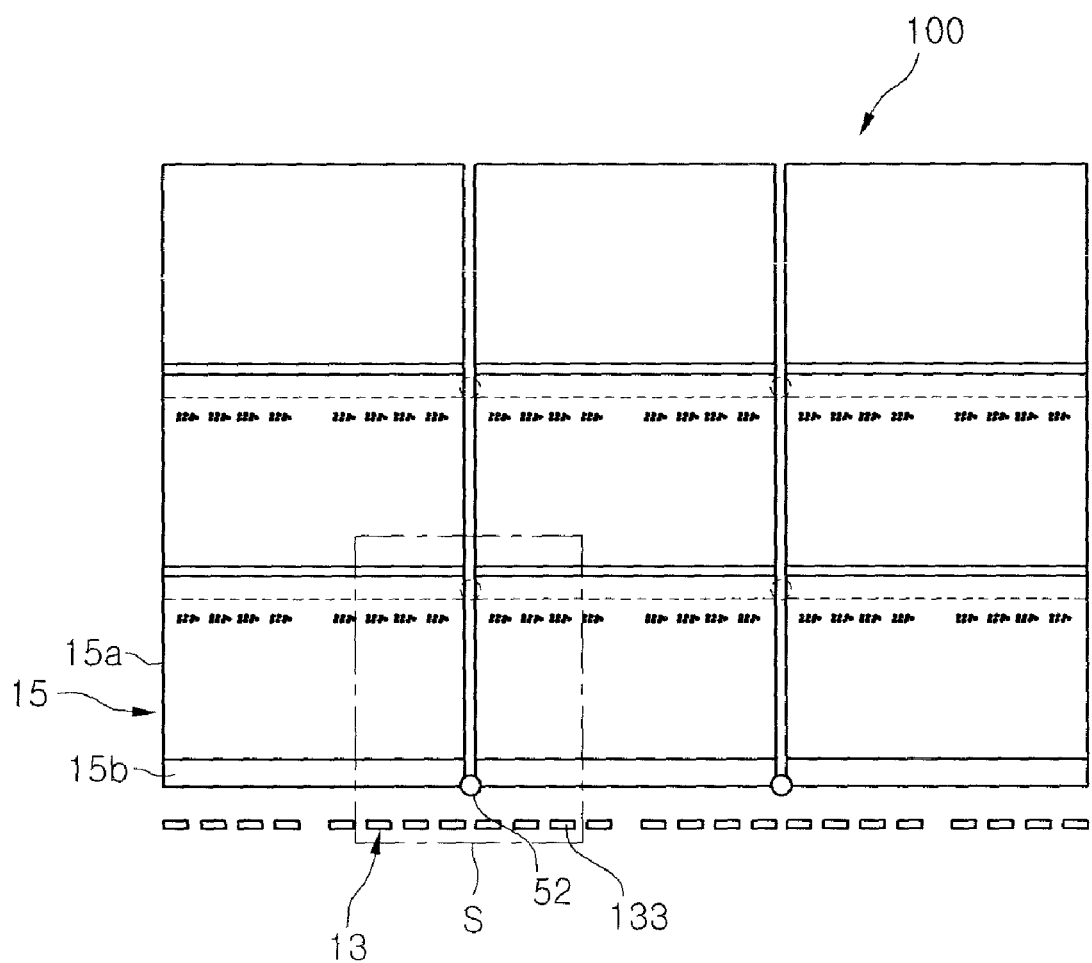
FIG. 14 is a plan view illustrating a backlight unit.
Figure 15:
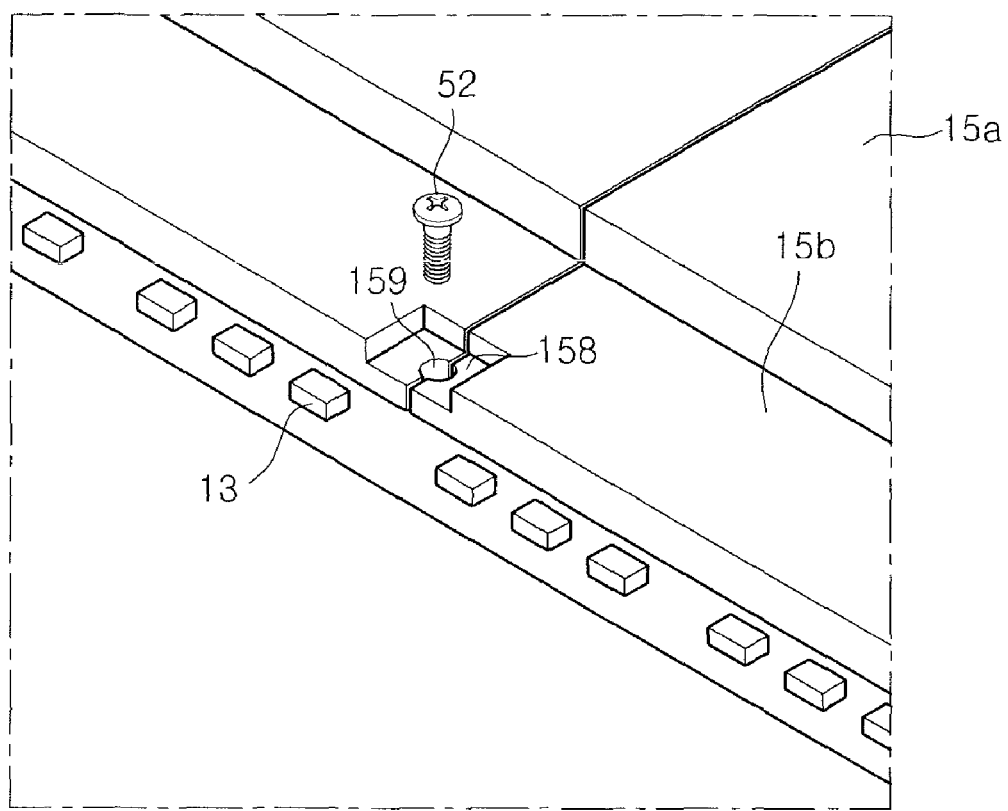
FIG. 15 is an enlarged view illustrating a portion C of FIG. 14.

FIG. 14 is a plan view illustrating the backlight unit 100. FIG. 15 is an enlarged view illustrating a portion C of FIG. 14.

This embodiment may be the same as FIG. 3 except for a structure configured to fix or attach the light guide plate 15, which may be described in detail.

As shown in FIGS. 14 and 15, the backlight unit 100 may include a fixing member 52 that is configured to simultaneously fix or attach the adjacent light guide plates 15 to a bottom cover.

More particularly, the light incident parts 15b adjacent to each other may be respectively provided with recesses 158 that are symmetric to each other.

When the recesses 158 of the light incident parts 15b are adjacent to each other, the width of the recesses 158 may be greater than a head of the fixing member 52.

The recesses 158 may be provided with a through hole 159 through which a portion of the fixing member 52 passes.

The height of the head may be less than or equal to the depth of the recess 158 (i.e., a distance between the upper surface of the light incident part 15b and a surface of the recess 158). This may prevent the head from protruding out of the recess 158.

When the light guide plates 15 are adjacent to each other, the fixing member 52 may be inserted into the through hole 159 defined by the light guide plates 15, and may be fixed or attached to the bottom cover. The head of the fixing member 52 may be provided at the recesses 158 to simultaneously press the light guide plates 15 to the bottom cover, so that the fixing member 52 may fix or attach the light guide plates 15 to the bottom cover.

The recess 158 provided in the first light guide plate 15 may be referred to as a first insertion part, and the recess 158 provided in the second light guide plate 15 may be referred to as a second insertion part.

FIGS. 16 to 19 are schematic views illustrating arrangements of optical elements (or patterns).

These embodiments may be the same as FIG. 9 except for the optical elements and the reflecting members 17, which may be described in detail.

Figure 16:
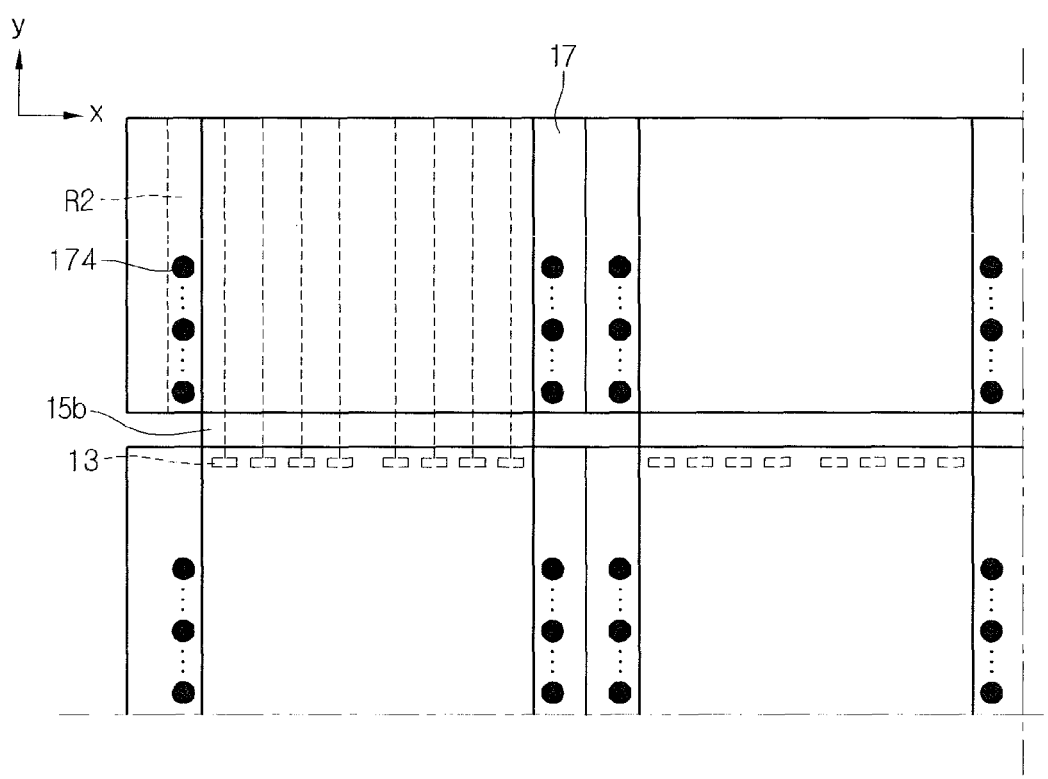
FIG. 16 is a schematic view illustrating an arrangement of optical elements (or patterns)

As shown in FIG. 16, the reflecting member 17 may be adjacent to a side edge of the light guide plate 15, and may include the second low-reflectance part R2 exposed upward, and the second low-reflectance elements 174 (also referred to as optical patterns) provided on the second low-reflectance part R2.

The edge at a second end of the reflecting member 17 may correspond to the edge at the second end of the light emitting part 15a.

Unlike FIG. 9, the side edge of the reflecting member 17 may extend out of the lateral width of the light guide plate 15, so that the reflecting member 17 may be exposed upward out of the light guide plate 15. However, the edge of the second end of the reflecting member 17 may be completely covered by the lower surface of the light guide plate 15.

The side edges of the reflecting members 17 arrayed in the longitudinal direction of the substrate 14 (i.e., in the x-axis direction in which the light sources 13 are arrayed) may be in contact with each other, but the reflecting members 17 arrayed in the y-axis direction may be spaced apart from each other by the distance by which the light guide plates 15 are spaced apart from each other in the y-axis direction.

Therefore, the second low-reflectance parts R2 and the second low-reflectance elements 174 of the reflecting member 17 may be provided only in portions corresponding to the side edges of the light guide plates 15.

Figure 17:
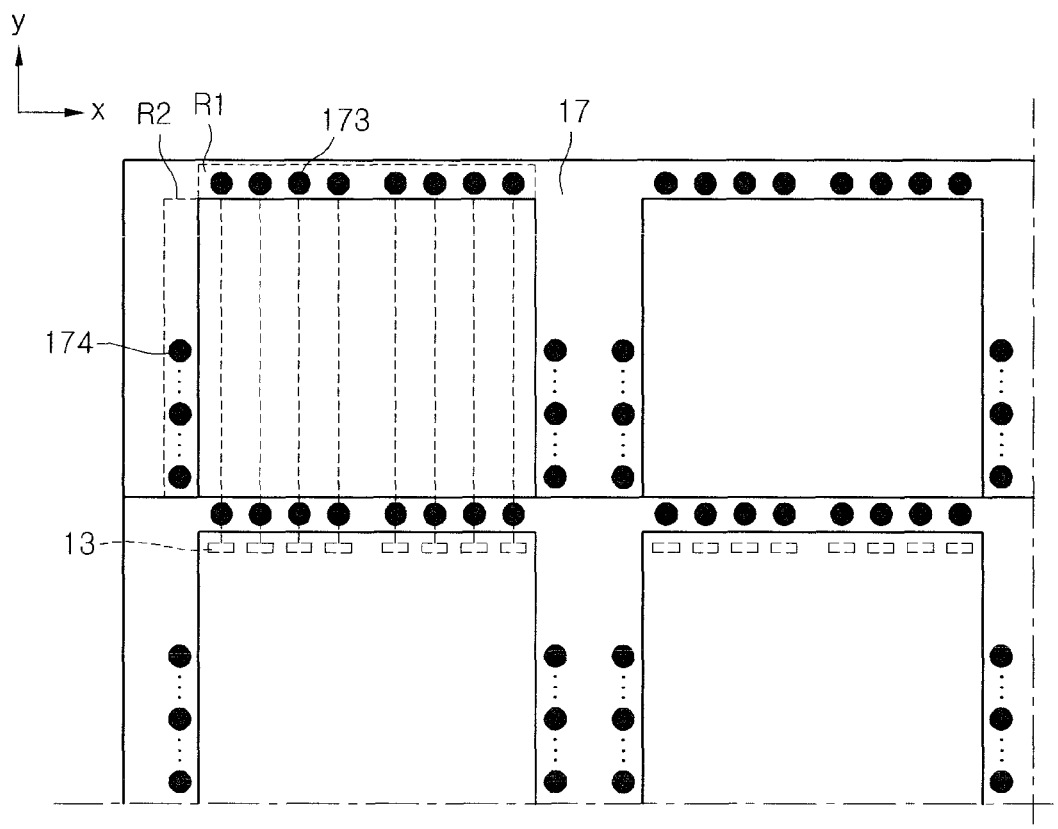
FIG. 17 is a schematic view illustrating an arrangement of optical elements (or patterns)

As shown in FIG. 17, the reflecting member 17 may extend in the longitudinal direction of the substrate 14 (i.e., in the x-axis direction in which the light sources 13 are arrayed) and may be provided in a single piece.

The length of the reflecting member 17 in the y-axis direction may correspond to the length of the light guide plate 15 in the y-axis direction, like the embodiment of FIG. 9. Thus, the reflecting member 17 may be provided in plurality in the y-axis direction.

The first and second low-reflectance elements 173 and 174 may be provided in the reflecting member 17 between adjacent ones of the light guide plates 15.

Figure 18:
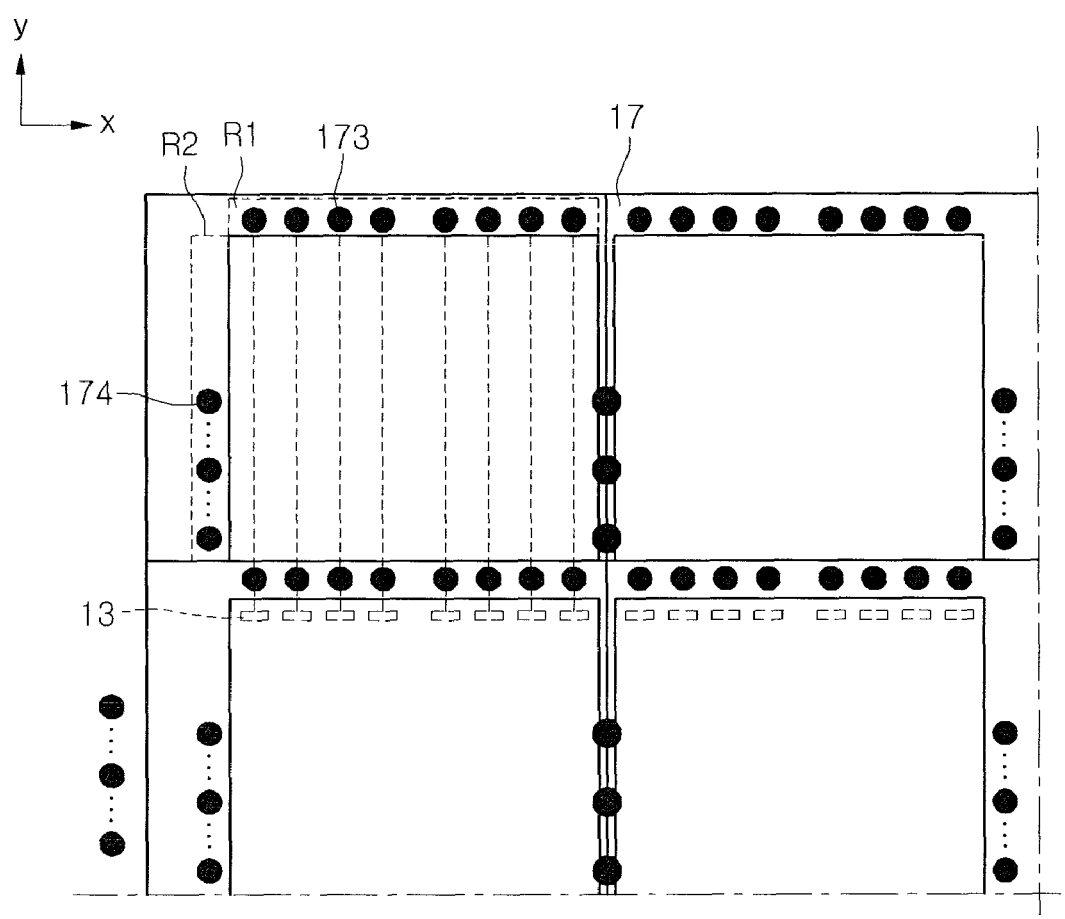
FIG. 18 is a schematic view illustrating an arrangement of optical elements (or patterns)

Referring to FIG. 18, in a backlight unit, a low-reflectance region provided in the boundary between the light guide plates 15, and the second optical elements 174 provided in the low-reflectance region may cover first regions overlapping the light guide plates 15 and second regions that do not overlap the light guide plates 15.

Figure 19:
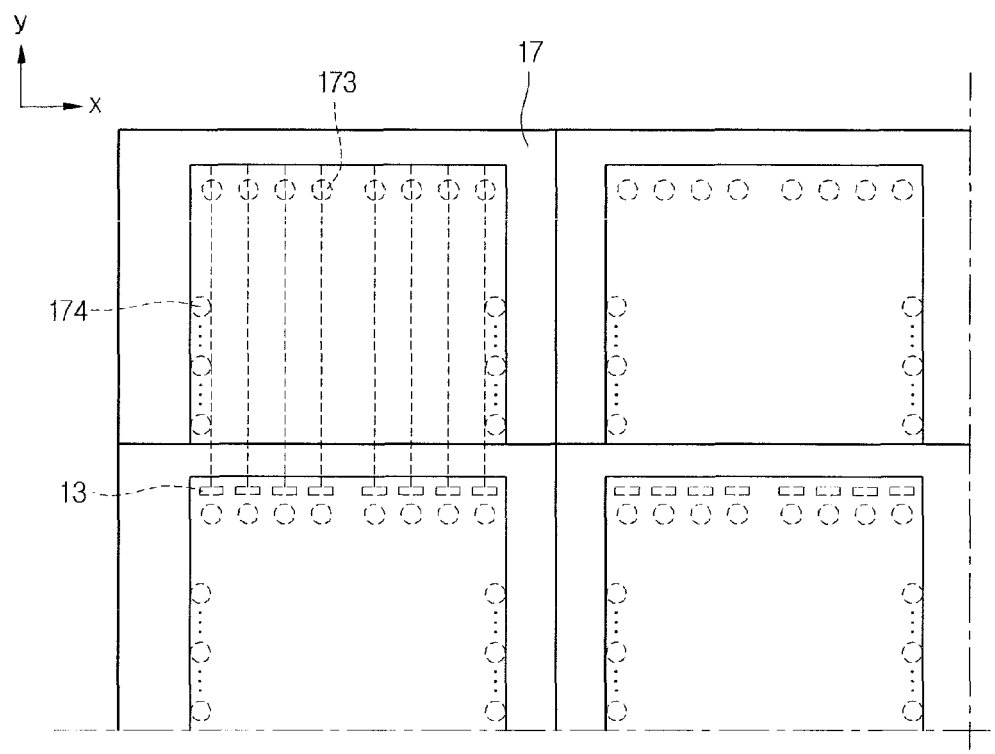
FIG. 19 is a schematic view illustrating an arrangement of optical elements (or patterns).

Referring to FIG. 19, in a backlight unit, the second low-reflectance elements 174 may be provided at portions corresponding to edges of the light guide plate 15 in first regions of the reflecting members 17 overlapping the light guide plates 15.

That is, the second low-reflectance elements 174 may be provided in the first regions at portions adjacent to second regions that do not overlap the light guide plate 15.

The module-type backlight unit including the light guide plates may provide light to the display panel. Thus, thickness of the display apparatus may decrease, and contrast of a display image may be improved using the entire driving method or the local driving method such as the local dimming method and the impulsive method.

Since the backlight unit may be driven using the local dimming method, the entire power consumption of the display apparatus may be reduced.

Since edges of the adjacent light guide plates may have a relatively uniform luminance distribution, a bright line may be prevented from occurring on the backlight unit to improve image quality of the display apparatus.

Embodiments may provide a backlight unit and a display apparatus including the backlight unit, which may improve quality of a display image.

A backlight unit may include a substrate, a plurality of light sources arrayed on the substrate, and a light guide plate (or panel) including: a light incident part having a light incident surface to which streaks of light respectively emitted from the light sources are laterally incident; and a light emitting part emitting the incident streaks of light upward and having a side adjacent and connected to the light incident part. At least one reflecting member may be provided on a lower surface of the light guide plate, the reflecting member reflecting the incident light, and an optical sheet may be provided above the light guide plate, wherein the reflecting member may be provided with an optical element (or pattern).

A backlight unit may also include a bottom cover, at least one substrate at the bottom cover, a plurality of light sources on the substrate, and a plurality of light guide plates including: a light incident part having a light incident surface to which streaks of light respectively emitted from the light sources are laterally incident, and a light emitting part emitting the incident streaks of light upward and having a side adjacent and connected to the light incident part. One or more reflecting members may be provided on lower surfaces of the light guide plates, the reflecting members reflecting the incident light. An optical element (or pattern) may be provided on the reflecting member. The light guide plates may include M (M is a natural number that is 2 or greater) light guide plates arrayed in a longitudinal direction of the substrate, and N (N is a natural number that is 2 or greater) light guide plates arrayed in a direction perpendicular to the longitudinal direction of the substrate, the light emitting part of a $K^{th}$ (K is one of 1 to N−1) light guide plate of the N light guide plates may have a distant end from the light incident part, and the distant end may be provided on an upper side of the light incident part of a $K+1^{th}$ light guide plate, and the optical element (or pattern) may be provided on the reflection member between an $L^{th}$ (L is one of 1 to M−1) light guide plate and an $L+1^{th}$ light guide plate of the M light guide plates.

A display apparatus may include a display panel, a backlight unit on a rear side of the display panel, the backlight unit including a plurality of driving areas that are independently drivable corresponding to a grey level peak value or color coordinate signal of the display panel, and a driving part on a rear side of the backlight unit, the driving part driving at least one of the display panel and the backlight unit. The backlight unit may include a bottom cover, a substrate, a plurality of light sources arrayed on the substrate, and a light guide plate including: a light incident part having a light incident surface to which streaks of light respectively emitted from the light sources are laterally incident, and a light emitting part emitting the incident streaks of light upward and having a side adjacent and connected to the light incident part. At least one reflecting member may be provided on a lower surface of the light guide plate, the reflecting member reflecting the incident light. An optical sheet may be provided above the light guide plate. The reflecting member may be provided with an optical element (or pattern).

This application is related to Korean Applications Nos. 10-2008-0049146 filed on May 27, 2008, 10-2008-0061487 filed on Jun. 27, 2008, 10-2008-0099569 filed on Oct. 10, 2008, 10-2009-0035029 filed on Apr. 22, 2009 10-2009-0036472 filed Apr. 27, 2009, 10-2009-0052805 filed on Jun. 15, 2009, 10-2009-0061219 filed Jul. 6, 2009, 10-2009-0071111 filed Aug. 2, 2009, 10-2009-0072449 filed Aug. 6, 2009, 10-2009-0075120 filed on Aug. 14, 2009, 10-2009-0080654 filed on Aug. 28, 2009, 10-2009-0098844 filed on Oct. 16, 2009, and 10-2009-0098901 filed on Oct. 16, 2009, whose entire disclosures are incorporated herein by reference. Further, this application is related to U.S. Provisional Patent Application Nos. 61/219,480 filed on Jun. 23, 2009; 61/229,854 filed on Jul. 30, 2009; 61/230,844 filed on Aug. 3, 2009; 61/233,890 filed on Aug. 14, 2009; and 61/237,841 filed on Aug. 28, 2009 and U.S. application Ser. No. 12/453,885 filed on May 22, 2009, Ser. No. 12/618,603 filed on Nov. 13, 2009, Ser. No. 12/632,694 filed on Dec. 7, 2009, and Ser. Nos. 12/727,966, 12/728,001, 12/728,031, 12/728,065, 12/728,087, 12/728,111, and 12/728,131 all filed on Mar. 19, 2010, whose entire disclosures are incorporated herein by reference.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
   a substrate;
   a plurality of light sources on the substrate;
   a light guide plate including: a light incident part having a light incident surface to which light respectively emitted from the light sources are incident, and a light emitting part emitting the incident light;
   a reflecting member on a lower surface of the light guide plate, the reflecting member to reflect the incident light; and
   an optical sheet on the light guide plate,
   wherein the reflecting member includes a first region having a first reflectance and a second region having a second reflectance.

2. The backlight unit according to claim 1, wherein the second region is at an edge of the reflecting member.

3. The backlight unit according to claim 2, wherein the second region includes an area of the reflecting member between the light guide plate and another light guide plate.

4. The backlight unit according to claim 1, wherein the first region a central area of the reflecting member.

5. The backlight unit according to claim 1, wherein optical elements are provided in the second region of the reflecting member to change a reflectance of light at the second region.

6. The backlight unit according to claim 5, wherein the optical elements include one of a dark shape or a hole.

7. The backlight unit according to claim 5, wherein the optical elements change the reflectance of light at that region.

8. The backlight unit according to claim 5, wherein the optical elements include relief elements protruding from the reflecting member to the light guide plate.

9. The backlight unit according to claim 5, wherein the light guide plate overlaps the first region of the reflecting member, and the light guide plate does not overlap the second region of the reflecting member.

10. The backlight unit according to claim 5, wherein the optical elements are provided in the second region and at least one portion of the first region adjacent to the second region.

11. The backlight unit according to claim 5, wherein the optical elements are provided on the first region adjacent to the second region.

12. The backlight unit according to claim 5, wherein the reflecting member includes a first low-reflectance part in the second region,
the first low-reflectance part is provided at an edge of a region where an end of the light guide plate distant from the light incident part is provided, and the first low-reflectance part extends in a longitudinal direction of the substrate, and
the optical elements are provided in plurality on the first low-reflectance part.

13. The backlight unit according to claim 12, wherein the reflecting member further includes a second low-reflectance part in the second region,
the second low-reflectance part is provided at a side edge of the light guide plate, and the second low-reflectance part extends in a direction perpendicular to a longitudinal direction of the substrate, and
the optical elements are provided in plurality on the second low-reflectance part.

14. A backlight unit comprising:
a bottom cover;
at least one substrate at the bottom cover;
a plurality of light sources on the substrate;
a plurality of light guide plates including: a light incident part having a light incident surface to which light respectively emitted from the light sources are incident, and a light emitting part emitting the incident light; and
a reflecting member on a lower surfaces of the light guide plate, the reflecting member to reflect the incident light, wherein a plurality of optical elements are provided on the reflecting member, wherein the reflecting member includes a first region having a first reflectance and a second region having a second reflectance,
wherein the light guide plates include M (M is a natural number that is 2 or greater) light guide plates in a longitudinal direction of the substrate, and N (N is a natural number that is 2 or greater) light guide plates in a direction perpendicular to the longitudinal direction of the substrate,
the light emitting part of a $K^{th}$ (K is one of 1 to N−1) light guide plate of the N light guide plates has a distant end from the light incident part, and the distant end is provided on an upper side of the light incident part of a $K+1^{th}$ light guide plate, and
the optical elements are provided on the reflection member between an $L^{th}$ (L is one of 1 to M−1) light guide plate and an $L+1^{th}$ light guide plate of the M light guide plates.

15. The backlight unit according to claim 14, wherein the second region is at an edge of the reflecting member.

16. The backlight unit according to claim 14, wherein the second region includes an area of the reflecting member between the light guide plates.

17. The backlight unit according to claim 14, wherein the first region is at a central area of the reflecting member.

18. The backlight unit according to claim 14, wherein the optical elements change a reflectance of light.

19. The backlight unit according to claim 14, wherein the optical elements include one of a dark shape or a hole.

20. The backlight unit according to claim 14, wherein the reflecting member comprises a low-reflectance part,
the low-reflectance part is provided at an edge of the light guide plate, and the low-reflectance part extends in the direction perpendicular to the longitudinal direction of the substrate, and
the optical elements are provided in the low-reflectance part.

21. A display apparatus comprising:
a display panel;
a backlight unit on a rear side of the display panel, the backlight unit including a plurality of driving areas that are independently drivable; and
a driving part on a rear side of the backlight unit, the driving part driving at least one of the display panel or the backlight unit,
wherein the backlight unit includes:
a bottom cover,
a substrate,
a plurality of light sources on the substrate,
a light guide plate including: a light incident part having a light incident surface to which light respectively emitted from the light sources are incident, and a light emitting part emitting the incident light,
a reflecting member on a surface of the light guide plate, the reflecting member to reflect the incident light, and
an optical sheet on the light guide part,
wherein the reflecting member includes a first region having a first reflectance and a second region having a second reflectance.

22. The display apparatus according to claim 21, wherein the second region is at an edge of the reflecting member.

23. The display apparatus according to claim 22, wherein the second region includes an area of the reflecting member between the light guide plate and another light guide plate.

24. The display apparatus according to claim 21, wherein the first region is at a central area of the reflecting member.

25. The display apparatus according to claim 21, wherein optical elements are provided in the second region of the reflecting member to change a reflectance of light at the second region.

26. The display apparatus according to claim 25, wherein the optical elements are one of a dark shape or a hole.

27. The display apparatus according to claim 26, wherein the optical elements are provided at an edge of the reflecting member.

* * * * *